US012644412B2

(12) United States Patent
Gernone et al.

(10) Patent No.: US 12,644,412 B2
(45) Date of Patent: Jun. 2, 2026

(54) CRYOGENIC FUEL DISTRIBUTION SYSTEMS INCLUDING HEAT EXCHANGERS AND RELATED METHODS

(71) Applicants: GE Avio S.r.l., Turin (IT); General Electric Company, Schenectady, NY (US)

(72) Inventors: Mirko Gernone, Bari (IT); Michael Joseph Murray, Wyoming, OH (US)

(73) Assignees: General Electric Company, Evendale, OH (US); GE Avio S.r.l., Turin (IT)

( * ) Notice: Subject to any disclaimer, the term of this patent is extended or adjusted under 35 U.S.C. 154(b) by 0 days.

(21) Appl. No.: 18/680,746

(22) Filed: May 31, 2024

(65) Prior Publication Data

US 2025/0369391 A1     Dec. 4, 2025

(51) Int. Cl.
*F02C 7/14*     (2006.01)
*F02C 3/22*     (2006.01)
*F02C 7/224*     (2006.01)
*F02C 7/232*     (2006.01)

(52) U.S. Cl.
CPC ................. *F02C 7/14* (2013.01); *F02C 3/22* (2013.01); *F02C 7/224* (2013.01); *F02C 7/232* (2013.01); *F05D 2260/213* (2013.01)

(58) Field of Classification Search
CPC .... F02C 7/224; F02C 7/14; F02C 7/08; F02C 7/141; F02C 7/185; F02C 9/40; F02C 3/22; F15B 21/0423
See application file for complete search history.

(56) References Cited

U.S. PATENT DOCUMENTS

| | | | |
|---|---|---|---|
| 6,415,595 B1 * | 7/2002 | Wilmot, Jr. ............. F02C 7/224 |
| | | | 60/785 |
| 10,393,444 B2 | 8/2019 | Kusuda et al. |
| 11,448,130 B2 | 9/2022 | Ribarov |
| 11,674,443 B2 | 6/2023 | McCurdy Gibson et al. |
| 11,718,410 B2 | 8/2023 | Clarke et al. |
| 2012/0297780 A1 * | 11/2012 | Bruno ....................... F02C 7/22 |
| | | | 60/785 |
| 2014/0251585 A1 | 9/2014 | Kusuda et al. |
| 2016/0025339 A1 * | 1/2016 | Kamath .................... F02C 3/04 |
| | | | 60/39.12 |
| 2017/0030266 A1 * | 2/2017 | Cerny ..................... F02C 7/224 |
| 2020/0386249 A1 * | 12/2020 | Adamson ................. B64F 5/40 |
| 2021/0207537 A1 * | 7/2021 | Roberge ................... F04B 9/02 |
| 2021/0229827 A1 * | 7/2021 | Doman .................... F02C 7/14 |
| 2022/0145801 A1 * | 5/2022 | McCurdy Gibson ..... F02C 3/22 |
| 2022/0178306 A1 | 6/2022 | Durand et al. |
| 2022/0364513 A1 | 11/2022 | Muldoon et al. |
| 2023/0304439 A1 | 9/2023 | Holley et al. |

(Continued)

*Primary Examiner* — Gerald L Sung
*Assistant Examiner* — Jingchen Liu
(74) *Attorney, Agent, or Firm* — Hanley, Flight & Zimmerman, LLC

(57)     ABSTRACT

Heat exchangers for cryogenic fuel distribution systems and related methods are disclosed herein. An example aircraft disclosed herein includes a cryogenic fuel system including a cryogenic fuel, a hydraulic system including a hydraulic fluid, a gas turbine engine fluidly coupled to the cryogenic fuel system, and a heat exchanger fluidly coupled to the cryogenic fuel system, the heat exchanger to exchange heat between the cryogenic fuel and at least one of (1) the hydraulic fluid or (2) a working fluid thermally coupled to the hydraulic system.

10 Claims, 8 Drawing Sheets

(56) References Cited

U.S. PATENT DOCUMENTS

| | | | |
|---|---|---|---|
| 2023/0392551 A1 | 12/2023 | Minas | |
| 2023/0406515 A1 | 12/2023 | Veilleux, Jr. et al. | |
| 2025/0101910 A1* | 3/2025 | Sarkar | F02C 7/12 |
| 2025/0327423 A1* | 10/2025 | Newman | F02C 6/00 |

* cited by examiner

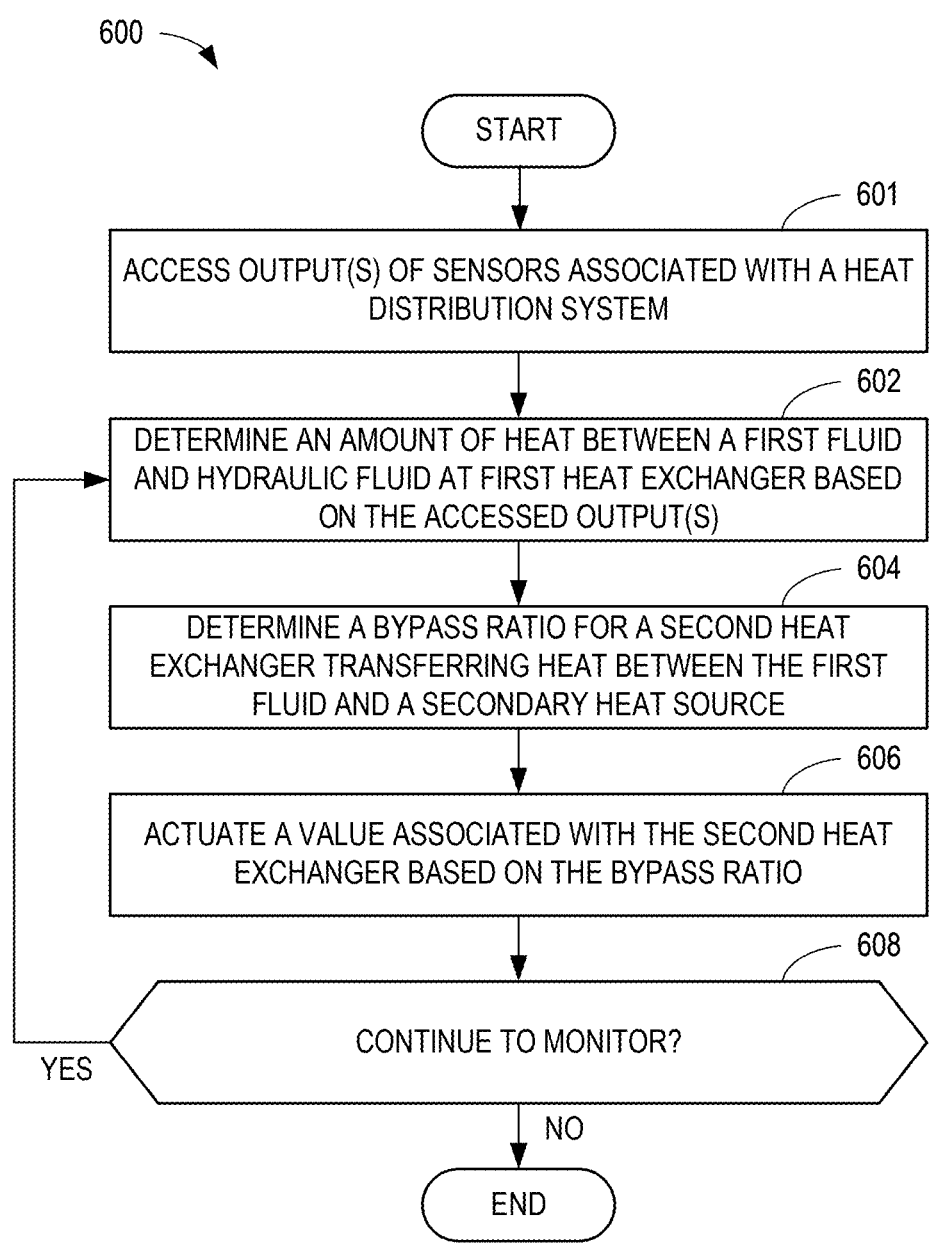

600

START

601
ACCESS OUTPUT(S) OF SENSORS ASSOCIATED WITH A HEAT DISTRIBUTION SYSTEM

602
DETERMINE AN AMOUNT OF HEAT BETWEEN A FIRST FLUID AND HYDRAULIC FLUID AT FIRST HEAT EXCHANGER BASED ON THE ACCESSED OUTPUT(S)

604
DETERMINE A BYPASS RATIO FOR A SECOND HEAT EXCHANGER TRANSFERRING HEAT BETWEEN THE FIRST FLUID AND A SECONDARY HEAT SOURCE

606
ACTUATE A VALUE ASSOCIATED WITH THE SECOND HEAT EXCHANGER BASED ON THE BYPASS RATIO

608
CONTINUE TO MONITOR?

YES

NO

END

FIG. 6

CRYOGENIC FUEL DISTRIBUTION SYSTEMS INCLUDING HEAT EXCHANGERS AND RELATED METHODS

FIELD OF THE DISCLOSURE

This disclosure relates generally to hydrogen fuel distribution systems and, more particularly, to cryogenic fuel distribution systems including heat exchangers and related methods.

BACKGROUND

Aircraft fuel distribution systems support fuel storage and fuel distribution to an engine. In some examples, a fuel system can include a single, gravity feed fuel tank with an associated fuel line connecting the tank to the aircraft engine. In some examples, multiple fuel tanks can be present as part of the fuel distribution system. These tank(s) can be located in a wing, a fuselage, and/or a tail of the aircraft. The tank(s) can be connected to internal fuel pump(s) with associated valve(s) and/or plumbing to permit feeding of the engine, refueling, defueling, individual tank isolation, and/or overall optimization of an aircraft's center of gravity.

BRIEF DESCRIPTION OF THE DRAWINGS

A full and enabling disclosure of the preferred embodiments, including the best mode thereof, directed to one of ordinary skill in the art, is set forth in the specification, which makes reference to the appended Figures, in which:

FIG. 6 is a flowchart representative of example machine readable instructions and/or example operations that may be executed, instantiated, and/or performed by example programmable circuitry to implement the fuel distribution controller circuitry of FIG. 5.

DETAILED DESCRIPTION

Figure 1:
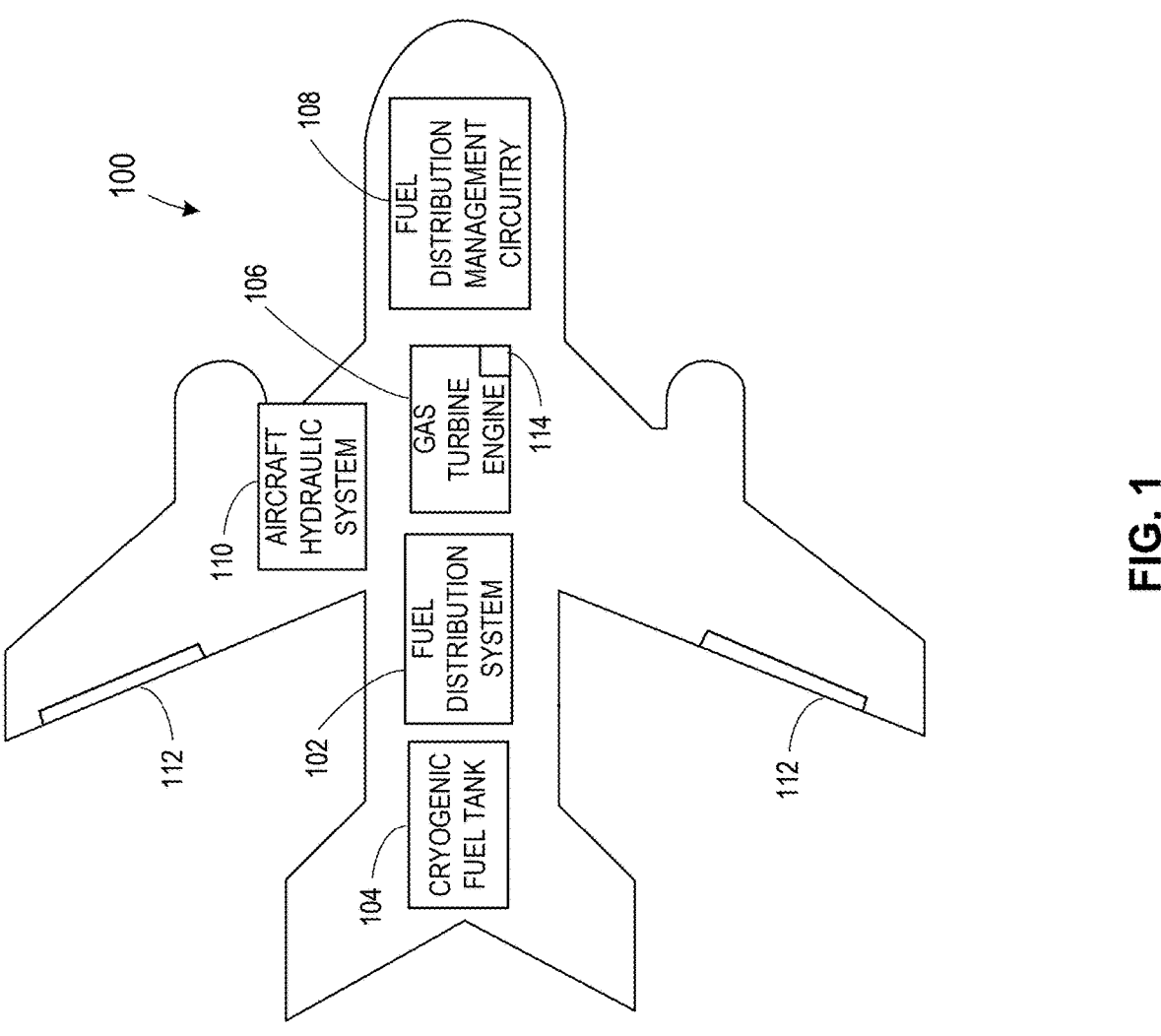
FIG. 1 is a simplified illustration of an aircraft including a hydrogen fuel distribution system including fuel distribution controller circuitry and in which the teachings of this disclosure can be implemented.

During operation, the hydraulic systems of gas turbine engines and aircraft become hot due to friction and inefficiencies in the hydraulic systems. Additionally, prior to being injected into a combustor, cryogenically stored fuel can be heated to prevent large thermal gradients within the combustor and to enable accurate measurement of the fuel entering the combustor. Example fuel distribution systems disclosed herein include heat exchangers that exchange heat between the hydraulic fluid of a gas turbine engine and/or the aircraft and cryogenic fuel, such as liquid hydrogen. Some example fuel distribution systems disclosed herein include a thermal transport bus that includes an intermediate working fluid to transfer heat between the hydraulic fluid and the cryogenic fuel. Examples disclosed herein reduce the total number and/or size of heat exchangers needed to operate an aircraft fueled by cryogenic fuels.

The terms "upstream" and "downstream" refer to the relative direction with respect to fluid flow in a fluid pathway. For example, "upstream" refers to the direction from which the fluid flows, and "downstream" refers to the direction which the fluid flows. Various terms are used herein to describe the orientation of features. As used herein, the orientation of features, forces, and moments are described with reference to the yaw axis, pitch axis, and roll axis of the vehicle associated with the features, forces, and moments. In general, the attached figures are annotated with a set of axes including the yaw axis Y, the roll axis R, and the pitch axis P. In some examples disclosed herein, the orientation of features is described with reference to clock positions. In these examples, the clock positions are described in reference to the position of the features in a plane defined by the yaw axis and pitch axis (the Yaw-Pitch plane), wherein the 12 o'clock position is oriented along the yaw-axis.

Aircraft and gas turbine engines can include hydraulic systems to control aero-surfaces, control valves, land gears, and/or other systems. During operation, inefficiency and friction can increase the temperature of the hydraulic fluid. In some examples, if the hydraulic fluid overheats, the hydraulic fluid can degrade and decrease the efficacy of the hydraulic system. To dissipate excess heat from the hydraulic fluid, some prior aircrafts include dedicated heat exchangers, which cool the hydraulic fluid via a heat sink, such as the ambient environment of the aircraft. In recent years, hydrogen has been explored as a fuel source for aircraft. One way to store the large amount of hydrogen needed to fuel a gas turbine engine is cryogenically. In some systems, to prevent damage to the combustor of gas turbine engines and to enable the monitoring of hydrogen entering the combustor, hydrogen is heated to non-cryogenic temperatures before injection into the combustor. The heating of such cryogenic hydrogen can require a dedicated heat exchanger and a heat source, such as bleed air from the gas turbine engine. In some such examples, the syphoning of bleed air from the gas turbine engine reduces the efficiency of the gas turbine engine.

Examples disclosed herein include cryogenic fuel distribution systems that include heat exchangers that exchange heat between hydraulic fluid and cryogenic fuel. Some examples disclosed herein include fuel distribution systems that include a first heat exchanger that transfers heat between the hydraulic fluid and the cryogenic fuel and a second heat exchanger that exchanges heat between the cryogenic fuel and a secondary heat source. In some such examples disclosed herein, the first heat exchanger is upstream of the second heat exchanger in the fuel distribution system. Some examples disclosed herein include a thermal transport bus that includes a working fluid that flows through a sequence of heat exchangers to transfer heat between the cryogenic fuel source, the hydraulic fluid, and the secondary heat source. Examples disclosed herein reduce the design requirements of dedicated hydrogen heating heat exchangers, which decreases the weight of such heat exchangers and the associated demand for a heat source, such as bleed air. Examples disclosed herein mitigate the need for dedicated hydraulic fluid cooling heat exchangers. Examples disclosed herein reduce the weight of aircraft and increase the efficiency of gas turbine engines due to the reduction of the need for bleed air.

FIG. 1 is an example illustration of an aircraft 100 including an example fuel distribution system 102. In the illustrated example of FIG. 1, the fuel distribution system 102 includes a cryogenic fuel tank 104, which provides cryogenic fuel to a gas turbine engine 106. In the illustrated example of FIG. 1, the aircraft 100 includes fuel distribution management circuitry 108. In the illustrated example of FIG. 1, the aircraft 100 includes an aircraft hydraulic system 110 and aero-surfaces 112. In the illustrated example of FIG. 1, the gas turbine engine 106 includes an engine hydraulic system 114.

In the illustrated example of FIG. 1, the aircraft 100 is a fixed-wing commercial plane. In other examples, the aircraft 100 can be another fixed-wing aircraft (e.g., an unmanned aerial vehicle (UAV), a military aircraft, etc.), a rotary-wing aircraft (e.g., a helicopter, etc.), an astronautical vehicle (e.g., a launch vehicle, a satellite, a crewed vessel, etc.). In the illustrated example of FIG. 1, the aircraft 100 includes a single gas turbine engine (e.g., the gas turbine engine 106, etc.), which propels and/or powers the aircraft 100. The gas turbine engine 106 can be implemented by any suitable type of gas turbine engine 106 including a turbofan, a turbojet, a turboprop, a turboshaft, and/or another type of turbomachinery. In some examples, the aircraft 100 can include multiple gas turbine engines, such as multiple gas turbine engines mounted beneath the wings of the aircraft 100. While the examples described herein are described with reference to the aircraft 100 and the gas turbine engine 106, it should be appreciated that the examples described herein are applicable to any system that combusts a cryogenic fuel and/or otherwise includes cryo-cooled fuel and a hydraulic system.

The fuel distribution system 102 is a cryogenic fuel system that transports fuel (e.g., hydrogen, methane, etc.) from the cryogenic fuel tank 104 to the gas turbine engine 106. In some examples, the fuel distribution system 102 includes one or more pumps, which drive the fuel from the cryogenic fuel tank 104 to the gas turbine engine 106. In some examples, the fuel distribution system 102 includes one or more heat exchangers, which heat the fuel prior to combustion within gas turbine engine 106. For example, the fuel distribution system 102 can include one or more heat exchangers, which transfer heat between the fuel of the fuel distribution system 102 (e.g., heats the fuel of the fuel distribution system 102, etc.) and the hydraulic fluid of the aircraft hydraulic system 110 and/or the hydraulic fluid of the engine hydraulic system 114 (e.g., cooling the hydraulic fluid of the hydraulic systems 110, 114, etc.). In some examples, the fuel distribution system 102 includes additional heat exchangers that transfer heat between the fuel of the fuel distribution system 102 and another source of heat associated with the aircraft 100 (e.g., a flow through the gas turbine engine 106, the ambient environment of the aircraft 100, a lubrication of the gas turbine engine, an electric heater, etc.). Example implementations of the fuel distribution system 102 are described below in conjunction with FIGS. 2-4.

The cryogenic fuel tank 104 is a pressure vessel that contains cryogenic fuel for combustion within the gas turbine engine 106. For example, the cryogenic fuel tank 104 can include liquefied hydrogen. In some such examples, the cryogenic fuel tank 104 can contain hydrogen in various states, including liquid, gaseous, supercritical, cryogenic, and/or cryo-compressed states. The cryogenic fuel tank 104 can be stored in any suitable location on the aircraft (e.g., in the wings, in the fuselage, in an external tank, etc.). In some examples, the cryogenic fuel tank 104 can include multiple tanks (herein referred to as a tank bank, etc.). In some such examples, the aircraft 100 can include one or more tanks including liquid hydrogen, and one or more tanks including gaseous hydrogen. In some examples, the cryogenic fuel tank 104 can contain a liquified and/or cryo-compressed hydrocarbon, such as cryogenic methane (e.g., liquified methane, etc.). In some examples, the cryogenic fuel tank 104 can be implemented by multiple tanks containing fuel. For example, the cryogenic fuel tank 104 can include one or more tanks containing cryogenic hydrogen and one or more tanks containing cryogenic methane. Additionally or alternatively, the aircraft 100 can include one or more additional fuel tanks containing jet propellant one (JP1) and/or other non-cryogenically stored hydrocarbons.

The hydraulic systems 110, 114 include hydraulic fluid(s), which can be used to control (e.g., move, actuate, control, etc.) the position of features of the aircraft 100 and the gas turbine engine 106, respectively. For example, the aircraft hydraulic system 110 can control the position of the aero-surfaces 112 and/or other features of the control system of the aircraft 100. The movement of the aero-surfaces 112 can be used to modify the orientation of the aircraft 100 during operation (e.g., steer the aircraft 100, etc.). In the illustrated example of FIG. 1, the aero-surfaces 112 are ailerons. Additionally or alternatively, the aero-surfaces 112 include one or more flaps, one or more elevators, one or more rudders, one or more spoilers, one or more slats, etc. In some examples, the aircraft hydraulic system 110 can similarly regulate the position of the brakes of the aircraft 100, the extension and/or retraction of landing gear of the aircraft 100, the thrust reversers of the aircraft 100, and/or the doors of the aircraft 100.

The engine hydraulic system 114 regulates the position of one or more control elements of the gas turbine engine 106. For example, the engine hydraulic system 114 can regulate the position of one or more fuel control valves of the gas turbine engine, one or more lubricant valves of the gas turbine engine, the position of one or more variable stator vanes, the feathering of the fan blades, the position of one or more bleed control valves, etc. In some examples, one or both of the hydraulic systems 110, 114 can regulate the position of the valves of the fuel distribution systems described below in conjunction with the fuel distribution systems of FIGS. 2A-4.

During operation, friction and/or heat transfer from adjacent components of the aircraft 100 and/or gas turbine engine 106 increase the temperature of the hydraulic fluid of the hydraulic systems 110, 114. In some examples, if the hydraulic fluid of the hydraulic systems 110, 114 overheats, the hydraulic fluid can denature and/or otherwise degrade, which reduces the efficacy of the hydraulic systems 110, 114. The example fuel distribution system 102 includes one or more heat exchanger(s), which remove heat from hydraulic fluid of the aircraft hydraulic systems 110 and/or the engine hydraulic system 114. In some such examples, the heat removed from the hydraulic fluid of the hydraulic systems 110, 114 is transferred into cryogenic fuel flowing from the cryogenic fuel tank 104 to the gas turbine engine 106. Example heat exchangers for transferring heat between the fuel of the fuel distribution system 102 and the hydraulic fluids of one or both of the hydraulic systems 110, 114 are described below in conjunction with FIGS. 2-4.

In FIG. 1, the fuel distribution system 102 is controlled and monitored by the fuel distribution management circuitry 108. For example, the fuel distribution management circuitry 108 can regulate the exchange of heat in the fuel distribution system 102 (e.g., the heat exchange rate between the hydraulic fluid of the hydraulic systems 110, 114 and the fuel, the heat exchange rate between the fuel and a secondary heat source, etc.) such that the fuel enters the gas turbine engine 106 in a vaporous and/or a supercritical state/phase (e.g., the phase of the fuel changes from liquid to gas, the phase of the fuel changes from liquid to supercritical, etc.). In some examples, the fuel distribution system 102 can interface with one or more valves of the fuel distribution system 102 to change the flow rate of fuel through the heat exchangers of the fuel distribution system 102. An example implementation of the fuel distribution system 102 is described below in conjunction with FIG. 5.

The embodiments described herein are also applicable to other applications where hydrogen (H$_2$) is used as a fuel in the aircraft 100. The embodiments described herein also may be applicable to engine(s) other than gas turbine engines. For example, hydrogen may also be used as a fuel for other power generators. For example, the embodiment described herein are also applicable to fuel cells (e.g., hydrogen fuel cells, etc.) where the hydrogen is provided to generate electricity by reacting with air. Additionally, the embodiments described herein are also applicable to fuel sources other than hydrogen. For example, the embodiments described herein are also applicable to liquified and/or cryogenic hydrocarbons, such as methane (CH$_4$).

Figure 2A:
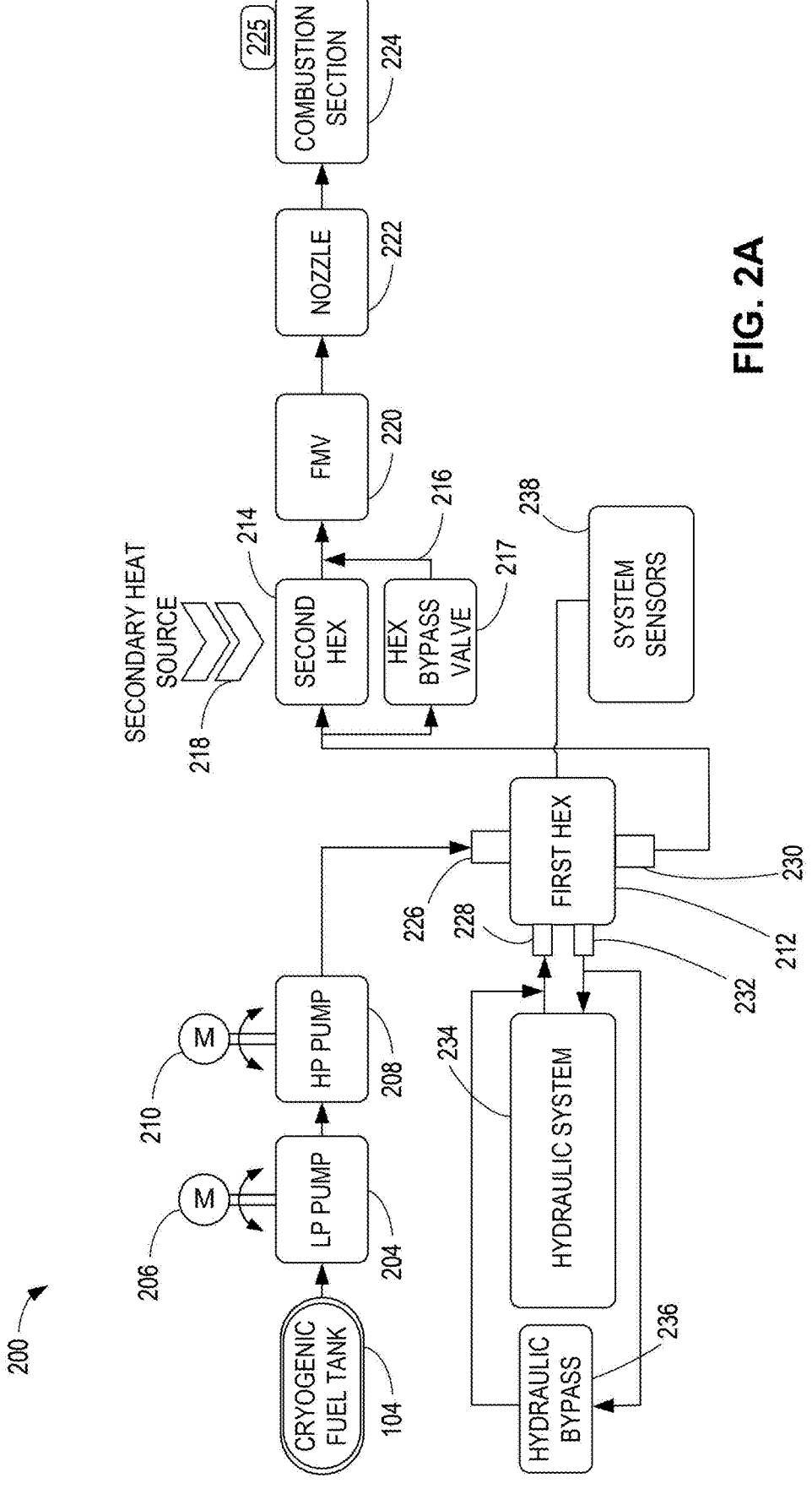
FIG. 2A is a schematic diagram of an example first fuel distribution system that can implement the fuel distribution of FIG. 1.

FIG. 2A is a block diagram of an example first fuel distribution system 200 that can be used to implement the fuel distribution system 102 of FIG. 1. In the illustrated example of FIG. 2A, the first fuel distribution system 200 includes the cryogenic fuel tank 104 of FIG. 1, a low pressure (LP) pump 204, a first motor 206, a first high pressure (HP) pump 208, a second motor 210, a first heat exchanger 212, a second heat exchanger 214, a heat exchanger bypass 216, and a heat exchanger bypass valve 217. In the illustrated example of FIG. 2A, the second heat exchanger 214 receives heat from a secondary heat source 218. In the illustrated example of FIG. 2A, the fuel distribution system 102 includes a fuel metering valve 220 (FMV), a nozzle 222, and a combustion section 224 of the gas turbine engine 106 of FIG. 1. In some examples, the first fuel distribution system 200 can include additional components, such as a throttling valve, additional pumps, additional motors, and/or a shut-off overspeed valve(s) (SOOV).

The first fuel distribution system 200 facilitates the flow from the cryogenic fuel tank 104 to the combustion section 224 by flowing through a sequence of components in series. In the illustrated example of FIG. 2A, the cryogenic fuel tank 104 is coupled to the LP pump 204, which is powered by the first motor 206. In the illustrated example of FIG. 2A, after exiting the LP pump 204, the fuel flows into the HP pump 208, which is powered by the second motor 210. In the illustrated example of FIG. 2A, after exiting the HP pump 208, the fuel flows into the first heat exchanger 212. In the illustrated example of FIG. 2A, after exiting the first heat exchanger 212, the fuel flows into the second heat exchanger 214 and/or the heat exchanger bypass 216. In the illustrated example of FIG. 2A, after exiting the second heat exchanger 214 and/or the heat exchanger bypass 216, the fuel enters the FMV 220. In the illustrated example of FIG. 2A, after exiting the FMV 220, the fuel enters the nozzle 222 and into the combustion section 224.

The pumps 204, 208 drive the fuel through the first fuel distribution system 200. In the illustrated example of FIG. 2A, the LP pump 204, which is driven by the first motor 206 supplies pressurized fuel to the HP pump 208. The HP pump 208, which is driven by the second motor 210, increases the pressure of the fuel prior to entering the first heat exchanger 212. In some examples, the pumps 204, 208 are centrifugal pumps. In other examples, one or both of the pumps 204, 208 are other types of pumps (e.g., axial pump(s), vane pump(s), gear pump(s), etc.). In some examples, the motors 206, 210 are powered via the operation of the gas turbine engine 106. In other examples, the motors 206, 210 can be independently fueled (e.g., via a fuel cell, etc.) and/or powered (e.g., via an auxiliary gear box of the gas turbine engine 106, via an electric motor, etc.). The FMV 220 is a control valve that regulates the volume and/or mass of fuel that enters the nozzle 222 and the combustion section 224. In some examples, the position of the FMV 220 can be regulated via the fuel distribution management circuitry 108 of FIG. 1 and controlled via the engine hydraulic system 114 of FIG. 1. In some examples, the FMV 220 can be controlled based on a power demand of the gas turbine engine 106 (e.g., based on an input of an operator of the gas turbine engine 106, based on a flight phase of the gas turbine engine 106, etc.).

The nozzle 222 is a mechanical structure that directs the flow of fuel into the combustion section 224. It should be appreciated the gas turbine engine 106 can include a plurality of nozzles similar to the nozzle 222. The combustion section 224 includes a combustor 225 that combusts the fuel, which generates thrust to propel the aircraft 100 of FIG. 1. The combustion section 224 and/or combustor 225 can be implemented by any suitable heat addition system for a turbomachine. For example, the combustion section 224 can be implemented by one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

In the illustrated example of FIG. 2A, the first heat exchanger 212 includes a first inlet 226, a second inlet 228, a first outlet 230, and a second outlet 232. In the illustrated example of FIG. 2A, the first inlet 226 is coupled to an outlet of the HP pump 208. In the illustrated example of FIG. 2A, the first outlet 230 is coupled to the second heat exchanger 214 and the heat exchanger bypass valve 217. In the illustrated example of FIG. 2A, the second inlet 228 and the second outlet 232 are coupled to a hydraulic system 234. During operation, fuel from the HP pump 208 enters the first heat exchanger 212 via the first inlet 226 and hydraulic fluid from the hydraulic system 234 enters the first heat exchanger 212 via the second inlet 228. Heat is exchanged between the hydraulic fluid and the fuel within the first heat exchanger 212, which cools the hydraulic fluid and heats the fuel. After exchanging heat, the fuel exits the first heat exchanger 212 via the first outlet 230 and the hydraulic fluid exits the first heat exchanger 212 via the second outlet 232. The first heat exchanger 212 can be implemented by one or more double tube heat exchanger(s), one or more shell and tube heat exchanger(s), one or more tube-in-tube heat exchanger(s), one or more plate heat exchanger(s), and/or one or more other suitable heat exchanger(s). The first heat exchanger 212 can be disposed at any suitable location in the gas turbine engine 106 (e.g., in the undercowl, engine mounted, etc.) and/or the aircraft 100 (e.g., in one or more of the wings of the aircraft 100, in the fuselage of the aircraft 100, etc.). In some examples, the first heat exchanger 212 is additively manufactured.

The hydraulic system 234 can be implemented by one or both of the aircraft hydraulic system 110 of FIG. 1 and/or the engine hydraulic system 114 of FIG. 1. In some such examples, the hydraulic systems 110, 114 are in fluid communication. That is, in some examples, the hydraulic systems 110, 114 include common (e.g., shared, etc.) hydraulic fluid, which is received by the second inlet 228 of the first heat exchanger 212. In the illustrated example of FIG. 2A, the hydraulic system 234 includes an example hydraulic bypass 236. In the illustrated example of FIG. 2A, the hydraulic bypass 236 enables a portion of the hydraulic fluid exiting the first heat exchanger 212 via the second outlet 232 to be recirculated to the second inlet 228 and cooled again by the first heat exchanger 212. In some examples, the flow of hydraulic fluid through the hydraulic bypass 236 can be regulated by a hydraulic flow control valve (not illustrated). In some examples, the hydraulic bypass 236 can be absent. In some examples, the flow of hydraulic fluid through the hydraulic bypass 236 can be in the opposite direction (e.g., backflow, etc.).

After leaving the first heat exchanger 212, the fuel enters the second heat exchanger 214. Heat is exchanged between the fluid associated with the secondary heat source 218 and the fuel within the second heat exchanger 214, which heats the fuel and cools the fluid associated with the secondary heat source 218. After exchanging heat, fuel exits the second heat exchanger 214. The second heat exchanger 214 can be implemented by one or more double tube heat exchanger(s), one or more shell and tube heat exchanger(s), one or more tube-in-tube heat exchanger(s), and/or one or more plate heat exchanger(s).

In some examples, to regulate the amount of heat transferred into the fuel by the second heat exchanger 214, the fuel distribution management circuitry 108 actuates the heat exchanger bypass valve 217 to regulate the relative portion of the fuel that passes through the second heat exchanger 214 and the relative portion of the fuel that passes through the heat exchanger bypass 216. In some examples, the fuel distribution management circuitry 108 can control the heat exchanger bypass valve 217 such that the fuel exiting the second heat exchanger 214 is in a gaseous and/or supercritical state (e.g., the hydrogen exiting the second heat exchanger 214 is gaseous hydrogen, the hydrogen exiting the second heat exchanger 214 is supercritical hydrogen, etc.). In some examples, the supercritical and/or vaporous phase of the fuel facilitates the metering of the fuel by the FMV 220. In some examples, the direct combustion of cryogenic liquid hydrogen can create a large temperature difference (e.g., a temperature gradient, a temperature deviation, a temperature delta, etc.) between the inlet and outlet of the combustion section 224, which can damage the combustion section 224 and/or reduce the efficiency thereof. In some examples, the second heat exchanger 214 is absent. In some such examples, the fuel of the first fuel distribution system 200 is heated solely by the first heat exchanger 212 (e.g., by the hydraulic fluid of the hydraulic system 234, etc.).

The secondary heat source 218 can be implemented by a flow of air through the gas turbine engine 106 of FIG. 1. For example, the secondary heat source 218 can be a bleed flow from a compressor of the gas turbine engine 106, a bleed flow from a turbine of the gas turbine engine 106, and/or an exhaust flow exiting the gas turbine engine 106. Additionally or alternatively, the secondary heat source 218 can be a flow from an ambient environment of the aircraft 100 of FIG. 1 and/or a flow of lubricant from a lubrication system and/or a cooling system of the gas turbine engine 106 of FIG. 1 (e.g., the system used to cool and lubricate the bearings of the gas turbine engine 106, etc.). Additionally or alternatively, the secondary heat source 218 can be a waste heat recovery system, a fuel cell, an auxiliary power unit, an electrical heater, and/or, the combustion section 224.

In the illustrated example of FIG. 2A, in the first fuel distribution system 200, the first heat exchanger 212 is upstream of the second heat exchanger 214. That is, the fuel exiting the cryogenic fuel tank 104 is first heated in the first heat exchanger 212 (e.g., by the hydraulic fluid of the hydraulic system 234, etc.) and then heated by the second heat exchanger 214 (e.g., by the secondary heat source 218, etc.). In some examples, the configuration of the first fuel distribution system 200 (e.g., the sequential ordering of the heat exchangers 212, 214, etc.) increases the efficiency of the first heat exchanger 212. For example, the efficiency of a heat exchanger is proportional to the difference in temperature of the fluids flowing through the heat exchanger (e.g., a delta temperature, a temperature difference, etc.). In some examples, if the secondary heat source 218 is a heated air flow of the gas turbine engine 106 (e.g., a bleed flow, etc.), the temperature of the heated hydraulic fluid entering the first heat exchanger 212 is substantially lower than the heat of the secondary heat source 218. In some such examples, the upstream positioning of the first heat exchanger 212 relative to the second heat exchanger 214 increases the difference in temperature between the hydraulic fluid in the first heat exchanger 212 and the fuel in the first heat exchanger 212. The increased heat difference of fluids within the first heat exchanger 212 increases the efficiency of the first heat exchanger 212.

The heating of the fuel by the first heat exchanger 212 reduces the design requirements of the second heat exchanger 214. In some such examples, the presence of the first heat exchanger 212 reduces the size and weight requirements of the second heat exchanger 214. Additionally, in some examples, the reduced design requirements of the second heat exchanger 214 reduce the amount of bleed flow required for the secondary heat source 218, which enables bleed flow to be used for other purposes of the aircraft 100 (e.g., operation of an auxiliary gearbox, deicing, cabin pressurization, etc.) and/or not be siphoned from the gas turbine engine 106, which increases the efficiency of the gas turbine engine 106. In some examples, the first heat exchanger 212 also mitigates (e.g., removes, mitigates, etc.) the need for other dedicated heat exchangers to cool the hydraulic fluid of the hydraulic system 234, which reduces the weight of the aircraft 100. It should be appreciated that the first heat exchanger 212 and the first fuel distribution system 200 can be used to manage the thermal state of the fuel entering the combustion section 224 and the hydraulic fluid of the hydraulic system 234.

In the illustrated example of FIG. 2A, the first fuel distribution system 200 includes example system sensors 238. The system sensors 238 generate outputs associated with the operation of the first fuel distribution system 200. For example, the system sensors 238 can include temperature sensors that generate outputs related to the temperature of fuel entering the first heat exchanger 212 via the first inlet 226 and/or the temperature of the hydraulic fluid entering the first heat exchanger 212 via the second inlet 228. Additionally or alternatively, the system sensors 238 can include flow rate sensors (e.g., flowmeters, etc.) that related to the flow rate of hydraulic fluid through the first heat exchanger 212 and/or the flow rate of the hydraulic fluid flowing through the first heat exchanger 212. In other examples, the system sensors 238 can include additional sensors that measure other quantities related to the first fuel distribution system 200 and/or an aircraft including the first fuel distribution system 200 (e.g., the aircraft 100 of FIG. 1, etc.). For example, the system sensors 238 can measure a position of one or more of the valves of the hydraulic system 234 and/or the first fuel distribution system 200, the power setting of the gas turbine engine 106, an altitude of the aircraft 100, a density of the fuel, a pressure of the fuel, etc.

Figure 2B:
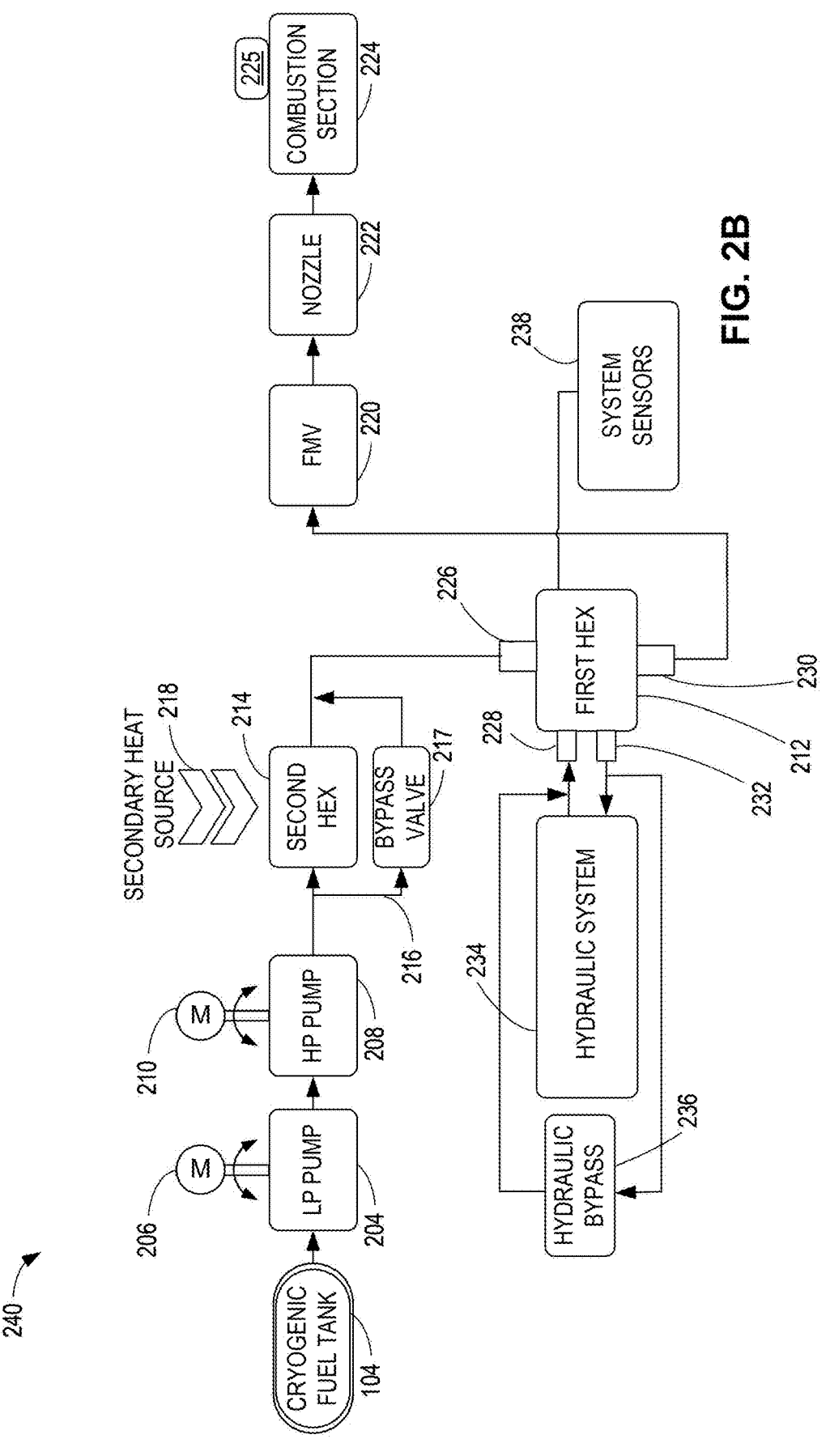
FIG. 2B is a schematic diagram of an example second fuel distribution system that can implement the fuel distribution of FIG. 1.

FIG. 2B is a schematic diagram of an example second fuel distribution system 240 that can be used to implement the fuel distribution system 102 of FIG. 1. The second fuel distribution system 240 includes the cryogenic fuel tank 104 of FIGS. 1 and 2A, the low pressure (LP) pump 204 of FIG. 2A, the first motor 206 of FIG. 2A, the first high pressure (HP) pump 208 of FIG. 2A, the second motor 210 of FIG. 2A, the first heat exchanger 212 of FIG. 2A, the second heat exchanger 214 of FIG. 2A, the heat exchanger bypass 216 of FIG. 2A, and the heat exchanger bypass valve 217 of FIG. 2A, the fuel metering valve 220 (FMV) of FIG. 2A, the nozzle 222 of FIG. 2A, and the combustion section 224 of FIG. 2A. In the illustrated example of FIG. 2B, the first heat exchanger 212 is fluidly coupled to the hydraulic system 234 of FIG. 2A and the hydraulic bypass 236 of FIG. 2A. In some examples, the second fuel distribution system 240 can include additional components, such as a throttling valve, additional pumps, additional motors, a shut-off overspeed valve (SOOV). In the illustrated example of FIG. 2B, the second fuel distribution system 240 includes the system sensors 238.

The second fuel distribution system 240 is similar to the first fuel distribution system 200 of FIG. 2A, except that the first heat exchanger 212 is downstream of the second heat exchanger 214 (e.g., the second heat exchanger 214 is upstream of the first heat exchanger 212, etc.). In the illustrated example of FIG. 2B, the fuel that exits the HP pump 208 enters the second heat exchanger 214 and is heated thereby. In the illustrated example of FIG. 2B, after exiting the second heat exchanger 214, fuel flows into the first inlet 226 of the first heat exchanger 212 and exits the first heat exchanger 212 via the first outlet 230. The second fuel distribution system 240 can be more efficient than the first fuel distribution system 200 of FIG. 2A if the secondary heat source 218 entering the second heat exchanger 214 is cooler than the hydraulic fluid entering the second inlet 228. It should be appreciated that the first heat exchanger 212 and the second fuel distribution system 240 can be used to manage the thermal state of the fuel entering the combustion section 224 and the hydraulic fluid of the hydraulic system 234.

Figure 3:
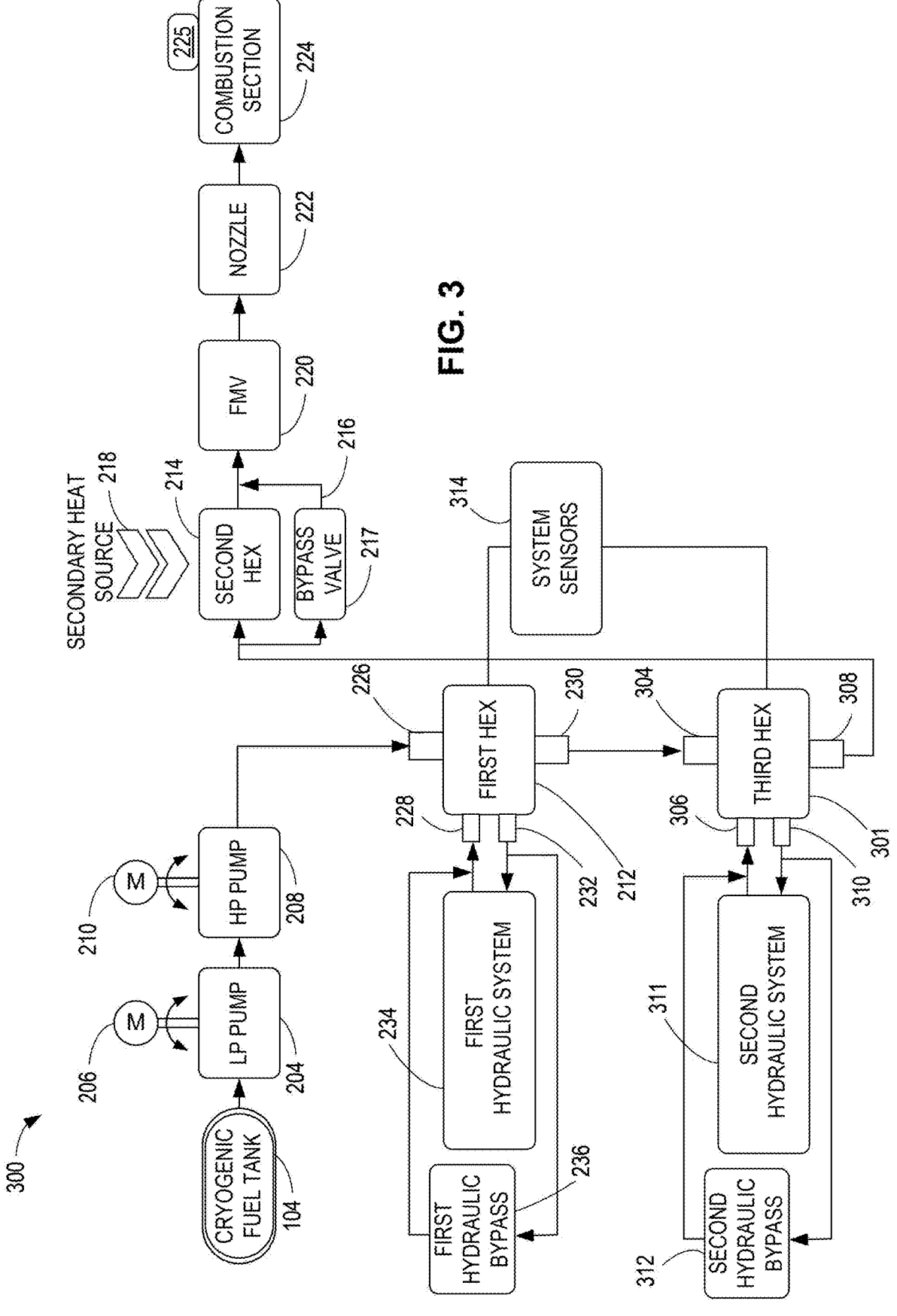
FIG. 3 is a schematic diagram of an example third fuel distribution system that can implement the fuel distribution of FIG. 1.

FIG. 3 is a schematic diagram of an example third fuel distribution system 300 that can be used to implement the fuel distribution system 102 of FIG. 1. The third fuel distribution system 300 includes the cryogenic fuel tank 104 of FIGS. 1-2B, the low pressure (LP) pump 204 of FIGS. 2A and 2B, the first motor 206 of FIGS. 2A and 2B, the first high pressure (HP) pump 208 of FIGS. 2A and 2B, the second motor 210 of FIGS. 2A and 2B, the first heat exchanger 212 of FIGS. 2A and 2B, the second heat exchanger 214 of FIGS. 2A and 2B, the heat exchanger bypass 216 of FIGS. 2A and 2B, and the heat exchanger bypass valve 217 of FIGS. 2A and 2B, the fuel metering valve 220 (FMV) of FIGS. 2A and 2B, the nozzle 222 of FIGS. 2A and 2B, and the combustion section 224 of FIGS. 2A and 2B. In the illustrated example of FIG. 3, the second heat exchanger 214 is fluidly coupled to the hydraulic system 234 of FIG. 2A and the hydraulic bypass 236 of FIG. 2A. In some examples, the second fuel distribution system 240 can include additional components, such as a throttling valve, additional pumps, additional motors, a shut-off overspeed valve (SOOV).

In the illustrated example of FIG. 3, the third fuel distribution system 300 includes a third heat exchanger 301. In the illustrated example of FIG. 3, the third heat exchanger 301 includes a third inlet 304, a fourth inlet 306, a third outlet 308, and a fourth outlet 310. In the illustrated example of FIG. 3, the third heat exchanger 301 is coupled to a second hydraulic system 311 and a second hydraulic bypass 312. In the illustrated example of FIG. 3, the third inlet 304 is coupled to the first outlet 230 of the first heat exchanger 212. In the illustrated example of FIG. 3, the third outlet 308 is coupled to the second heat exchanger 214 and the heat exchanger bypass valve 217. In the illustrated example of FIG. 3, the fourth inlet 306 and the fourth outlet 310 are coupled to the second hydraulic system 311 and the second hydraulic bypass 312. In some examples, the first hydraulic system 234 is the engine hydraulic system 114 of FIG. 1 and the second hydraulic system 311 is the aircraft hydraulic system 110 of FIG. 1. In other examples, the first hydraulic system 234 is the aircraft hydraulic system 110 of FIG. 1 and the second hydraulic system 311 is the engine hydraulic system 114 of FIG. 1.

During operation, fuel from the HP pump 208 enters the first heat exchanger 212 via the first inlet 226 and hydraulic fluid from the hydraulic system 234 enters the first heat exchanger 212 via the second inlet 228. Heat is exchanged between the hydraulic fluid and the fuel within the first heat exchanger 212, which cools the hydraulic fluid and heats the fuel. After exchanging heat, fuel exits the first heat exchanger 212 via the first outlet 230 and hydraulic fluid exits the first heat exchanger 212 via the second outlet 232. After leaving the first heat exchanger 212, the fuel flows sequentially into the third heat exchanger 301 and the hydraulic fluid from the second hydraulic system 311 enters the third heat exchanger 301, which cools the hydraulic fluid and heats the fuel. After exiting the third heat exchanger 301 via the third outlet 308, the fuel flows into the second heat exchanger 214. The third heat exchanger 301 can be implemented by one or more double tube heat exchanger(s), one or more shell and tube heat exchanger(s), one or more tube-in-tube heat exchanger(s), and/or one or more plate heat exchanger(s). In some examples, the third heat exchanger 301 can be implemented as the same type of heat exchanger as the first heat exchanger 212 and/or the second heat exchanger 214. In some examples, some or all of the heat exchangers 212, 214, 301 are additively manufactured.

In the illustrated example of FIG. 3, the third heat exchanger 301 is disposed in sequence with the first heat exchanger 212. In other examples, the third fuel distribution system 300 is disposed in parallel with the first heat exchanger 212. For example, (1) the first inlet 226 and the third inlet 304 can be coupled to HP pump 208 and (2) the first outlet 230 and the third outlet 308 can be coupled to the second heat exchanger 214, such that the fuel of the third fuel distribution system 300 flows the heat exchangers 212, 301 in parallel. In some such examples, the portion of the fuel flowing through the first heat exchanger 212 and the third heat exchanger 301 can be controlled via a control valve. In some such examples, the fuel distribution management circuitry 108 can determine the portion of the flow through the first heat exchanger 212 and the third heat exchanger 301. In some such examples, the fuel distribution management circuitry 108 can determine the relative portions through the first heat exchanger 212 and the third heat exchanger 301 based on the hydraulic systems 234, 311 (e.g., a size of the hydraulic systems 234, 311, a current temperature of the hydraulic fluid of the hydraulic systems 234, 311, a volume of the hydraulic fluid of the hydraulic systems 234, 311, etc.). It should be appreciated that the first heat exchanger 212, the third heat exchanger 301, and the third fuel distribution system 300 can be used to manage the thermal state of the fuel entering the combustion section 224 and the hydraulic fluid of the hydraulic systems 234, 311.

In the illustrated example of FIG. 3, the third fuel distribution system 300 includes example sensors 314, which are similar to the system sensors 238 of FIGS. 2A and 2B, except as noted otherwise. For example, the sensors 314 generate outputs associated with the operation of the fuel distribution system 300 (e.g., the temperature of the fuel, the flowrate of the hydraulic fluid, etc.). In some examples, the sensors 314 can include sensors that measure the flowrate and/or the temperature of the hydraulic fluid flowing through the third heat exchanger 301 associated with the second heat exchanger 214.

Figure 4:
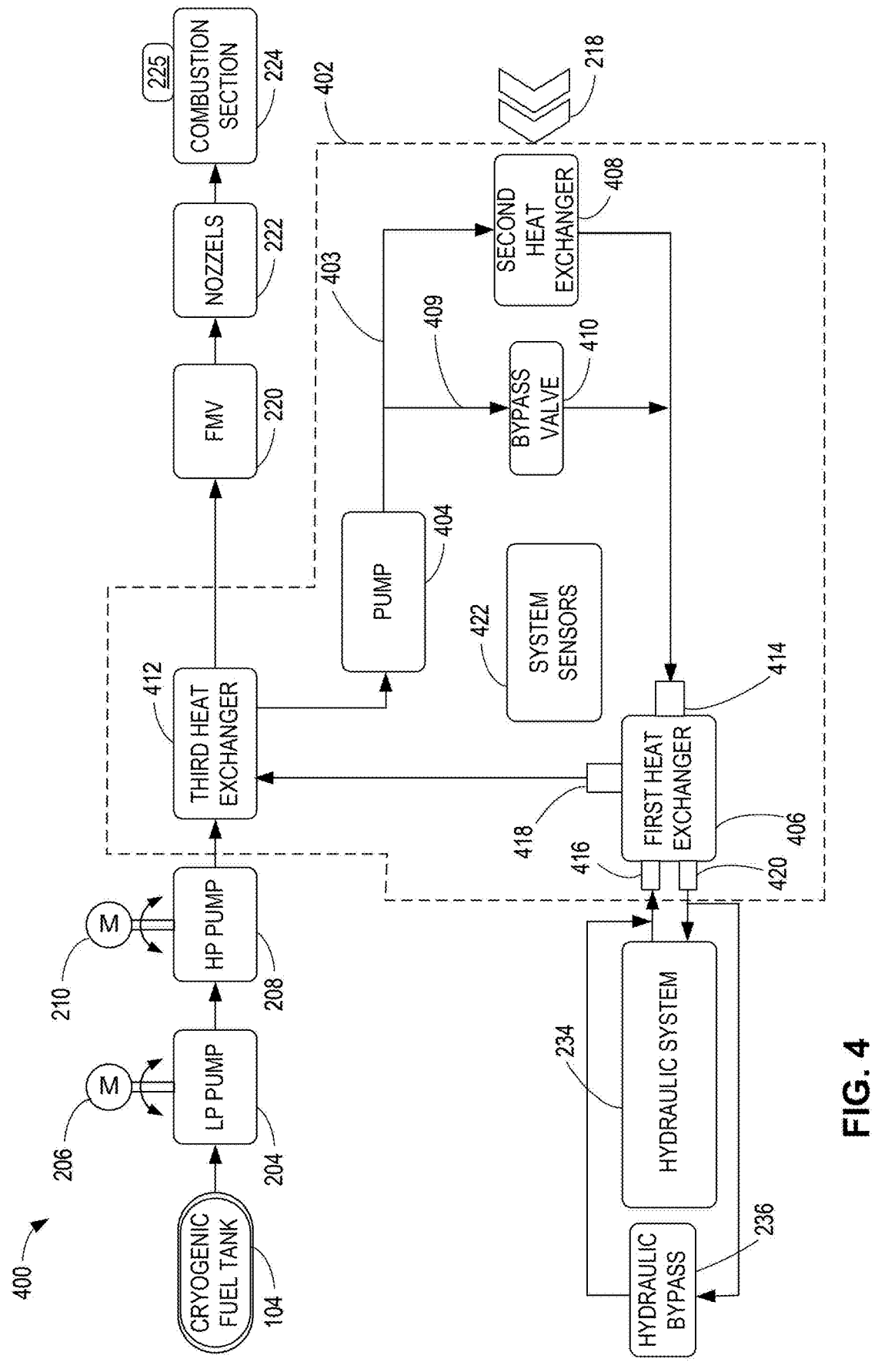
FIG. 4 is a schematic diagram of an example fourth fuel distribution system that can implement the fuel distribution of FIG. 1.

FIG. 4 is a schematic diagram of an example fourth fuel distribution system 400 that can be used to implement the fuel distribution system 102 of FIG. 1. The fourth fuel distribution system 400 includes the cryogenic fuel tank 104 of FIGS. 1-3, the low pressure (LP) pump 204 of FIGS. 2A-3, the first motor 206 of FIGS. 2A-3, the first high pressure (HP) pump 208 of FIGS. 2A-3, the second motor 210 of FIGS. 2A-3, the fuel metering valve 220 (FMV) of FIGS. 2A-3, the nozzle 222 of FIGS. 2A-3, and the combustion section 224 of FIGS. 2A-3 of the gas turbine engine 106. In the illustrated example of FIG. 4, the fourth fuel distribution system 400 includes a thermal management system 402, which includes a thermal transport bus 403, a pump 404, a first heat exchanger 406, a second heat exchanger 408, a heat exchanger bypass 409, a bypass valve 410, and a third heat exchanger 412. In the illustrated example of FIG. 4, the second heat exchanger 408 receives heat from the secondary heat source 218 of FIGS. 2A-3.

The thermal management system 402 is a fluid system for transferring heat between fluids supporting the operation of the aircraft 100 of FIG. 1 and/or gas turbine engine 106 of FIG. 1. In some examples, some or all of the components of the thermal management system 402 are positioned within the gas turbine engine 106. For example, some or all of the components of the thermal management system 402 can be positioned within the outer casing and/or a nacelle of the gas turbine engine 106. In other examples, the thermal management system 402 can be positioned at location on the aircraft 100 of FIG. 1 (e.g., in the fuselage, adjacent to the fuel tanks, in the wings, etc.). In the illustrated example of FIG. 4, the thermal management system 402 transfers heat between the hydraulic fluid of the hydraulic system 234 of FIGS. 2A-3, the fuel of the cryogenic fuel tank 104, and the secondary heat source 218. In other examples, the thermal management system 402 can additionally transfer heat between other fluids and/or components of the aircraft 100 and/or gas turbine engine 106 (e.g., the lubrication system of the gas turbine engine, an exhaust flow of the gas turbine engine, a bleed flow of the gas turbine engine, etc.).

During operation, a working fluid of the thermal management system 402 flows through the thermal transport bus 403 to the heat exchangers 406, 408, 412. The thermal transport bus 403 includes one or more fluid conduits through which the working fluid flows. As the working fluid flows through various heat exchangers, heat is added to the working fluid via the first heat exchanger 406 and the second heat exchanger 408 and removed from the working fluid via the third heat exchanger 412. The working fluid of the thermal management system 402 and the thermal transport bus 403 fluid can be supercritical carbon dioxide (sCO2), nitrogen, oil, liquid helium, helium-xenon, and/or a similar fluid. In the illustrated example of FIG. 4, the working fluid is driven through the thermal transport bus 403 by the pump 404. The pump 404 can be driven electrically and/or via an auxiliary gearbox of the gas turbine engine 106. In some examples, the pump 404 is an impeller (e.g., a single centrifugal compressor, etc.). In other examples, the pump 404 can be implemented by any other suitable type of pump (e.g., a gerotor, a vane pump, etc.) and/or compressor (e.g., an axial pump, a multi-stage centrifugal compressor, a rotary screw compressor, etc.). In some examples, the thermal management system 402 can include additional pumps similar to the compressor.

The heat exchangers 406, 408, 412 are similar to the heat exchangers 212, 214 of FIGS. 2A-3, except as noted otherwise. For example, the heat exchangers 406, 408, 412 can be implemented one or more double tube heat exchanger(s), one or more shell and tube heat exchanger(s), one or more tube-in-tube heat exchanger(s), and/or one or more plate heat exchanger(s). In some examples, the heat exchangers 406, 408, 412 can be implemented by the same type of heat exchanger. In other examples, some or all of the heat exchangers 406, 408, 412 can be implemented by a different type of heat exchanger.

In the illustrated example of FIG. 4, the first heat exchanger 406 includes a first inlet 414, a second inlet 416, a first outlet 418, and a second outlet 420. In the illustrated example of FIG. 4, the first inlet 414 and the first outlet 418 are coupled to the thermal transport bus 403. In the illustrated example of FIG. 4, the second inlet 416 and the second outlet 420 are coupled to the hydraulic system 234 and the hydraulic bypass 236 of FIGS. 2A-3. During operation, working fluid from the thermal transport bus 403 enters the first heat exchanger 406 via the first inlet 414 and hydraulic fluid from the hydraulic system 234 enters the first heat exchanger 406 via the second inlet 416. Heat is exchanged between the hydraulic fluid and the working fluid within the first heat exchanger 406, which cools the hydraulic fluid and heats the working fluid. After exchanging heat with the hydraulic fluid, the working fluid exits the first heat exchanger 406 via the first outlet 418 and the hydraulic fluid exits the first heat exchanger 406 via the second outlet 420. In the illustrated example of FIG. 4, the thermal transport bus 403 does not include a bypass to enable the working fluid of the thermal transport bus 403 to bypass the first heat exchanger 406. In other examples, the thermal transport bus 403 includes a bypass to allow some or all of the working fluid to bypass the first heat exchanger 406. In other examples, the bypass includes a valve to control the portion of flow through the first heat exchanger 406 and the bypass. In some such examples, the position of the valve is regulated by fluid from the thermal transport bus 403, hydraulic system 234, and/or another suitable control system. Additionally or alternatively, the position of the valve is positioned by a motor or electromagnetic actuator. Additionally or alternatively, the valve is controlled by the fuel distribution management circuitry 108 of FIG. 1.

The second heat exchanger 408 receives working fluid from the thermal transport bus 403 and heat from the secondary heat source 218. Heat is exchanged between the fluid associated with the secondary heat source 218 and the working fluid within the second heat exchanger 408, which heats the working fluid. In the illustrated example, the heat exchanger bypass 409 enables working fluid (e.g., some of the working fluid, all of the working fluid, etc.) to bypass the second heat exchanger 408. In some examples, the relative portions of the working fluid flowing through the second heat exchanger 408 and the heat exchanger bypass 409 can be regulated by the fuel distribution management circuitry 108 of FIG. 1.

The third heat exchanger 412 receives working fluid from the thermal transport bus 403 and fuel from the HP pump 208. The third heat exchanger 412 transfers heat between the fuel and the working fluid, which heats the fuel and cools the working fluid. After exchanging heat within the third heat exchanger 412, the fuel flows to the FMV 220 and the working fluid returns to the thermal transport bus 403. In the illustrated example of FIG. 4, the third heat exchanger 412 does not include a bypass conduit to enable the fuel from the cryogenic fuel tank 104 to bypass the third heat exchanger 412 or a bypass conduit to enable the working fluid of the thermal transport bus 403 to bypass the third heat exchanger 412. In other examples, the third heat exchanger 412 can include a bypass to allow some or all of the fuel from the cryogenic fuel tank 104 to bypass the third heat exchanger 412 and/or some or all of the working fluid to bypass the third heat exchanger 412. It should be appreciated that the heat exchangers 406, 408, 412 and the fourth fuel distribution system 400 can be used to manage the thermal state of the fuel entering the combustion section 224 and the hydraulic fluid of the hydraulic system 234.

In the illustrated example of FIG. 4, the fourth fuel distribution system 400 includes example sensors 422, which are similar to the system sensors 238 of FIGS. 2A and 2B and the sensors 314 of FIG. 3, except as noted otherwise. For example, the sensors 422 generate outputs associated with the operation of the fuel distribution system 400 (e.g., the temperature of the fuel, the flowrate of the hydraulic fluid, etc.). In some examples, the sensors 422 can include sensors that measure the flowrate and/or the temperature of the working fluid at various locations in the thermal transport bus 403.

Figure 5:
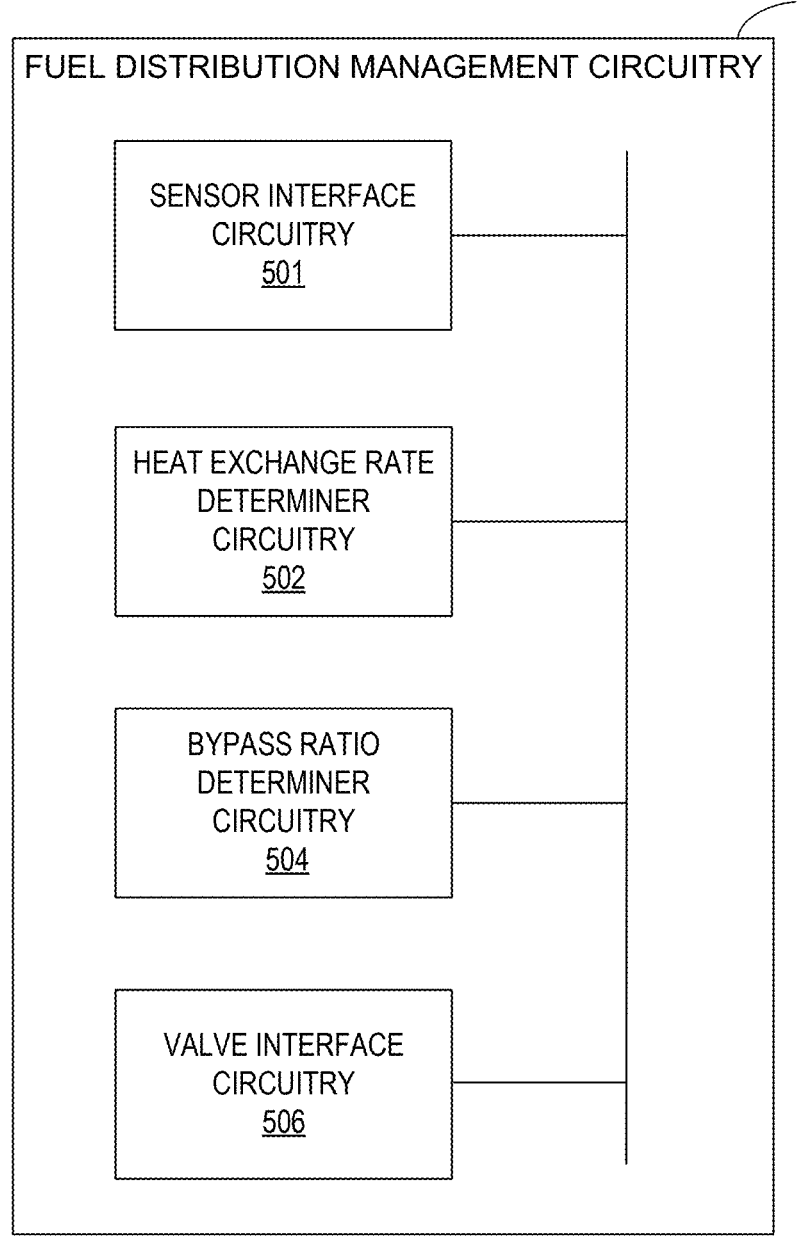
FIG. 5 is a block diagram of the fuel distribution controller circuitry of FIG. 1.

FIG. 5 is a block diagram of an example implementation of the fuel distribution management circuitry 108 of FIG. 1 to regulate the flow of fuel through the fuel distribution system 102 of FIG. 1, the first fuel distribution system 200 of FIG. 2A, the second fuel distribution system 240 of FIG. 2B, the third fuel distribution system 300 of FIG. 3, and/or the fourth fuel distribution system 400 of FIG. 4, and the transfer of heat between the fuel and the hydraulic fluid of the hydraulic systems 110, 114 of FIG. 1. For example, the fuel distribution management circuitry 108 can be used to determine the position of the heat exchanger bypass valve 217 of FIGS. 2A-3 and/or the bypass valve 410 of FIG. 4. In the illustrated example of FIG. 5, the fuel distribution management circuitry 108 includes sensor interface circuitry 501, heat exchange rate determiner circuitry 502, bypass ratio determiner circuitry 504, and valve interface circuitry 506.

The fuel distribution management circuitry 108 of FIG. 5 may be instantiated (e.g., creating an instance of, bring into being for any length of time, materialize, implement, etc.) by programmable circuitry such as a Central Processor Unit (CPU) executing first instructions. Additionally or alternatively, the fuel distribution management circuitry 108 of FIG. 5 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 5 may, thus, be instantiated at the same or different times. Some or all of the circuitry of FIG. 5 may be instantiated, for example, in one or more threads executing concurrently on hardware and/or in series on hardware. Moreover, in some examples, some or all of the circuitry of FIG. 5 may be implemented by microprocessor circuitry executing instructions and/or FPGA circuitry performing operations to implement one or more virtual machines and/or containers.

The sensor interface circuitry 501 accesses (e.g., receives, retrieves, etc.) sensor data from the sensors associated with a fuel distribution system (e.g., the fuel distribution systems 200, 240, 300 of FIGS. 2A-3, etc.). For example, the sensor interface circuitry 501 can receive sensor outputs from system sensors 238 of FIGS. 2A and 2B, the sensors 314 of FIG. 3 and/or the sensors 422 of FIG. 4. In some examples, the sensor interface circuitry 501 can transform the accessed sensor output from a machine-readable format (e.g., a voltage, a current, etc.) to a human-readable format (e.g., an integer, a floating-point number, etc.). In some examples, the sensor interface circuitry 501 is instantiated by programmable circuitry executing sensor interface instructions and/ or configured to perform operations such as those represented by the flowcharts of FIG. 6.

In some examples, the fuel distribution management circuitry 108 includes means for interfacing with a sensor. For example, the means for interfacing with a sensor may be implemented by the heat exchange rate determiner circuitry 502. In some examples, the sensor interface circuitry 501 may be instantiated by programmable circuitry such as the example programmable circuitry 712 of FIG. 7. For instance, the sensor interface circuitry 501 may be instantiated a microprocessor executing machine executable instructions such as those implemented by at least blocks 601 of FIG. 6. In some examples, the sensor interface circuitry 501 may be instantiated by hardware logic circuitry, which may be implemented by an ASIC, XPU, or FPGA circuitry configured and/or structured to perform operations corresponding to the machine readable instructions. Additionally or alternatively, the sensor interface circuitry 501 may be instantiated by any other combination of hardware, software, and/or firmware. For example, the sensor interface circuitry 501 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The heat exchange rate determiner circuitry 502 determines a rate of heat exchange between the hydraulic fluid and another fluid (e.g., fuel in the fuel distribution systems 200, 240, 300 of FIGS. 2A-3, working fluid in the fourth fuel distribution system 400 of FIG. 4, etc.). For example, the heat exchange rate determiner circuitry 502 can determine a rate of heat exchange between fuel and hydraulic fluid in the first heat exchanger 212 of FIGS. 2A, 2B, and 3 based on sensor data accessed the sensor interface circuitry 501. In some such examples, the heat exchange rate determiner circuitry 502 can determine the heat exchange rate in the first heat exchanger 212 based on a flow rate of fuel into the first inlet 226 of the first heat exchanger 212, a flow rate of hydraulic fluid into the second inlet 228 the first heat exchanger 212, the specific heat of the fuel, the specific heat of the hydraulic fluid, the geometry of the first heat exchanger 212, and the difference in temperature between hydraulic fluid and fuel. In other examples, the heat exchange rate determiner circuitry 502 can determine the rate of heat exchange between the hydraulic fluid and the working fluid in the first heat exchanger 406 of FIG. 4. In some such examples, the heat exchange rate determiner circuitry 502 can determine the heat exchange rate in the first heat exchanger 406 based on a flow rate of working fluid into the first inlet 414 of the first heat exchanger 406, a flow rate of hydraulic fluid into the second inlet 416 of the first heat exchanger 406, the specific heat of the working fluid, the specific heat of the hydraulic fluid, the geometry of the first heat exchanger 406, and the difference in temperature (e.g., the temperature difference, etc.) between hydraulic fluid and the working fluid.

In some examples, the heat exchange rate determiner circuitry 502 can determine the rate of heat exchange in multiple heat exchangers associated with the exchange of heat between fuel and hydraulic fluid. For example, the heat exchange rate determiner circuitry 502 can determine the total rate of heat exchange in the first heat exchanger 212 and the third heat exchanger 301 in the third fuel distribution system 300 of FIG. 3. In some examples, the heat exchange rate determiner circuitry 502 is instantiated by programmable circuitry executing heat exchange rate determiner instructions and/or configured to perform operations such as those represented by the flowcharts of FIG. 6.

In some examples, the fuel distribution management circuitry 108 includes means for determining a rate of heat exchange between hydraulic fluid and fuel. For example, the determining a rate of heat exchange between hydraulic fluid and fuel may be implemented by the heat exchange rate determiner circuitry 502. In some examples, the heat exchange rate determiner circuitry 502 may be instantiated by programmable circuitry such as the example programmable circuitry 712 of FIG. 7. For instance, the heat exchange rate determiner circuitry 502 may be instantiated by a microprocessor executing machine executable instructions such as those implemented by at least blocks 602 of FIG. 6. In some examples, the heat exchange rate determiner circuitry 502 may be instantiated by hardware logic circuitry, which may be implemented by an ASIC, XPU, or FPGA circuitry configured and/or structured to perform operations corresponding to the machine readable instructions. Additionally or alternatively, the heat exchange rate determiner circuitry 502 may be instantiated by any other combination of hardware, software, and/or firmware. For example, the heat exchange rate determiner circuitry 502 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The bypass ratio determiner circuitry 504 determines a bypass ratio for a second heat exchanger transferring heat between a secondary heat source and the first fluid. For example, the bypass ratio determiner circuitry 504 can determine a portion of the fuel to flow through the second heat exchanger 214 of FIGS. 2A-3 and a corresponding portion of the fuel to flow through the heat exchanger bypass 216 of FIGS. 2A-3 (e.g., the ratio of the mass flow rate of fuel through the second heat exchanger to the mass flow rate of fuel flowing through the heat exchanger bypass 216, etc.). In some examples, the bypass ratio determiner circuitry 504 can determine the bypass ratio for the second heat exchanger 214 based on the heat exchange rate of the first heat exchanger 212 determined by the heat exchange rate determiner circuitry 502, the mass flow rate of fuel through the second heat exchanger 214, the properties of the secondary heat source (e.g., the mass flow rate of the secondary heat source into the secondary heat source 218, the specific heat of the secondary heat source 218, the temperature of the secondary heat source 218, etc.), the temperature of the fuel entering the second heat exchanger 214, and the desired input condition of the fuel into the combustion section 224. For example, the bypass ratio of the second heat exchanger 214 can be determined such that the secondary heat source 218 heats the fuel to a target temperature and/or into a gaseous or supercritical state. That is, the bypass ratio determiner circuitry 504 can determine the bypass ratio of the second heat exchanger 214 such that the total amount of heat transferred into the fuel by the heat exchangers 212, 214 heats the fuel to a target temperature and/or into a desired state (e.g., gaseous, supercritical, etc.).

In other examples, the bypass ratio determiner circuitry 504 can determine a portion of the working fluid to flow through the second heat exchanger 408 and the corresponding portion of the fuel to flow through the heat exchanger bypass 409 (e.g., the ratio of the mass flow rate of working fluid through the second heat exchanger 408 to the mass flow rate of working flowing through the heat exchanger bypass 409, etc.). In some examples, the bypass ratio determiner circuitry 504 can determine the bypass ratio such that the working fluid has a temperature that causes the fuel to assume a target temperature and/or condition when exiting the third heat exchanger 412. For example, the bypass ratio determiner circuitry 504 can determine the bypass ratio such that the fuel has a target temperature (e.g., the vaporization temperature of gaseous hydrogen at the pressure of the system, the critical temperature of hydrogen, etc.), a target phase (e.g., the hydrogen is a vapor, the hydrogen is in a supercritical state, etc.).

In some examples, the bypass ratio determiner circuitry 504 can determine the bypass ratio for the second heat exchanger 408 based on the heat exchange rate of the first heat exchanger 406 determined by the heat exchange rate determiner circuitry 502, the mass flow rate of working fluid through the second heat exchanger 408, the specific heat of the working fluid, the properties of the secondary heat source (e.g., the mass flow rate of the secondary heat source into the secondary heat source 218, the specific heat of the secondary heat source 218, the temperature of the secondary heat source 218, etc.), the temperature of the working fluid entering the second heat exchanger 408, the properties of third heat exchanger 412 (e.g., the properties of the fuel entering the third heat exchanger 412, the geometry of the third heat exchanger 412, etc.) and the desired input condition of the fuel into the combustion section 224. In some examples, the bypass ratio determiner circuitry 504 is instantiated by programmable circuitry executing bypass ratio determiner instructions and/or configured to perform operations such as those represented by the flowchart(s) of FIG. 6.

In some examples, the fuel distribution management circuitry 108 includes means for determining a bypass ratio of a heat exchanger. For example, the means for determining may be implemented by the bypass ratio determiner circuitry 504. In some examples, the bypass ratio determiner circuitry 504 may be instantiated by programmable circuitry such as the example programmable circuitry 712 of FIG. 7. For instance, the bypass ratio determiner circuitry 504 may be instantiated by a microprocessor executing machine executable instructions such as those implemented by at least blocks 604 of FIG. 6. In some examples, the bypass ratio determiner circuitry 504 may be instantiated by hardware logic circuitry, which may be implemented by an ASIC, XPU, or FPGA circuitry configured and/or structured to perform operations corresponding to the machine readable instructions. Additionally or alternatively, the bypass ratio determiner circuitry 504 may be instantiated by any other combination of hardware, software, and/or firmware. For example, the bypass ratio determiner circuitry 504 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The valve interface circuitry 506 interfaces with the heat exchanger bypass valve 217 of FIGS. 2A-3, hydraulic bypass 236 of FIGS. 2A-4, second hydraulic bypass 312 of FIG. 3, and/or the bypass valve 410 of FIG. 4. For example, the valve interface circuitry 506 actuates a value associated with the second heat exchanger 214 based on the determined bypass ratio. For example, the valve interface circuitry 506 can actuate the heat exchanger bypass valve 217 of FIGS. 2A-3 such that the flow rate of fuel through the second heat exchanger 214 and the heat exchanger bypass 216 is in accordance with the determined bypass ratio. In some examples, the valve interface circuitry 506 can actuate the heat exchanger bypass valve 217 of FIGS. 2A-3 such that the flow rate of working fluid through the second heat exchanger 408 and the heat exchanger bypass 409 is in accordance with the determined bypass ratio. In some examples, the valve interface circuitry 506 can interface valve via an electric signal, an optical signal, via a hydraulic system (e.g., transmitted via one or more of the hydraulic systems 110, 114 of FIG. 1, etc.), and/or a pneumatic signal. In some examples, the valve interface circuitry 506 is instantiated by programmable circuitry executing valve interface instructions and/or configured to perform operations such as those represented by the flowchart(s) of FIG. 6.

In some examples, the fuel distribution management circuitry 108 includes means for interfacing with a bypass valve. For example, the interfacing with a bypass valve may be implemented by the valve interface circuitry 506. In some examples, the valve interface circuitry 506 may be instantiated by programmable circuitry such as the example programmable circuitry 712 of FIG. 7. For instance, the valve interface circuitry 506 may be instantiated by a microprocessor executing machine executable instructions such as those implemented by at least blocks 606, 608 of FIG. 6. In some examples, the valve interface circuitry 506 may be instantiated by hardware logic circuitry, which may be implemented by an ASIC, XPU, or FPGA circuitry configured and/or structured to perform operations corresponding to the machine readable instructions. Additionally or alternatively, the valve interface circuitry 506 may be instantiated by any other combination of hardware, software, and/or firmware. For example, the valve interface circuitry 506 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

While an example manner of implementing the fuel distribution management circuitry 108 of FIG. 1 is illustrated in FIG. 5, one or more of the elements, processes, and/or devices illustrated in FIG. 5 may be combined, divided, re-arranged, omitted, eliminated, and/or implemented in any other way. Further, the sensor interface circuitry 501, the heat exchange rate determiner circuitry 502, the bypass ratio determiner circuitry 504, the valve interface circuitry 506, and/or, more generally, the example fuel distribution management circuitry 108 of FIG. 5, may be implemented by hardware alone or by hardware in combination with software and/or firmware. Thus, for example, any of the sensor interface circuitry 501, the example heat exchange rate determiner circuitry 502, the bypass ratio determiner circuitry 504, the valve interface circuitry 506, and/or, more generally, the example fuel distribution management circuitry 108, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example fuel distribution management circuitry 108 of FIG. 5 may include one or more elements, processes, and/or devices in addition to, or instead of, those illustrated in FIG. 5, and/or may include more than one of any or all of the illustrated elements, processes and devices.

A flowchart representative of example machine readable instructions, which may be executed by programmable circuitry to implement and/or instantiate the fuel distribution management circuitry 108 of FIG. 5 and/or representative of example operations which may be performed by programmable circuitry to implement and/or instantiate the fuel distribution management circuitry 108 of FIG. 5, is shown in FIG. 6. The machine readable instructions may be one or more executable programs or portion(s) of one or more executable programs for execution by programmable circuitry such as the programmable circuitry 712 shown in the example programmable circuitry platform 700 discussed below in connection with FIG. 7 and/or may be one or more function(s) or portion(s) of functions to be performed by example programmable circuitry (e.g., an FPGA). In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart illustrated in FIG. 7, many other methods of implementing the example fuel distribution management circuitry 108 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIG. 7 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/ or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

FIG. 6 is a flowchart representative of example machine readable instructions and/or example operations 600 that may be executed, instantiated, and/or performed by programmable circuitry to regulate the flow of fuel through the fuel distribution system 102 of FIG. 1, the first fuel distribution system 200 of FIG. 2A, the second fuel distribution system 240 of FIG. 2B, the third fuel distribution system 300 of FIG. 3, and/or the fourth fuel distribution system 400 of FIG. 4, and the transfer of heat between the fuel and the hydraulic fluid of the hydraulic systems 110, 114 of FIG. 1.

The example machine-readable instructions and/or the example operations 600 of FIG. 6 begin at block 601, at which sensor interface circuitry 501 accesses (e.g., receives, retrieves, etc.) sensor data from the sensors associated with a fuel distribution system (e.g., the fuel distribution systems 200, 240, 300 of FIGS. 2A-3, etc.). For example, the sensor interface circuitry 501 can receive sensor outputs from system sensors 238 of FIGS. 2A and 2B, the sensors 314 of FIG. 3 and/or the sensors 422 of FIG. 4. In some examples, the sensor interface circuitry 501 can transform the accessed sensor output from a machine-readable format (e.g., a voltage, a current, etc.) to a human-readable format (e.g., an integer, a floating-point number, etc.).

At block 602, the heat exchange rate determiner circuitry 502 determines the rate of heat exchange between a first fluid and hydraulic fluid in a first heat exchanger based on the accessed sensor outputs. For example, the heat exchange rate determiner circuitry 502 can determine a rate of heat exchange between fuel and hydraulic fluid in the first heat exchanger 212 of FIGS. 2A, 2B, and 3. In some such examples, the heat exchange rate determiner circuitry 502 can determine the heat exchange rate in the first heat exchanger 212 based on a flow rate of fuel into the first inlet 226 of the first heat exchanger 212, a flow rate of hydraulic fluid into the second inlet 228 the first heat exchanger 212, the specific heat of the fuel, the specific heat of the hydraulic fluid, the geometry of the first heat exchanger 212, and the difference in temperature between hydraulic fluid and fuel. In other examples, the heat exchange rate determiner circuitry 502 can determine the rate of heat exchange between the hydraulic fluid and the working fluid in the first heat exchanger 406 of FIG. 4. In some such examples, the heat exchange rate determiner circuitry 502 can determine the heat exchange rate in the first heat exchanger 406 based on a flow rate of working fluid into the first inlet 414 of the first heat exchanger 406, a flow rate of hydraulic fluid into the second inlet 416 the first heat exchanger 406, the specific heat of the working fluid, the specific heat of the hydraulic fluid, the geometry of the first heat exchanger 406, and the difference in temperature between hydraulic fluid and the working fluid. In some examples, the heat exchange rate determiner circuitry 502 can determine the rate of heat exchange in multiple heat exchangers associated with the exchange of heat between fuel and hydraulic fluid. For example, the heat exchange rate determiner circuitry 502 can determine the total rate of heat exchange in the first heat exchanger 212 and the third heat exchanger 301 in the third fuel distribution system 300 of FIG. 3.

At block 604, the bypass ratio determiner circuitry 504 determines a bypass ratio for a second heat exchanger transferring heat between a secondary heat source and the first fluid. For example, the bypass ratio determiner circuitry 504 can determine a portion of the fuel to flow through the second heat exchanger 214 of FIGS. 2A-3 and a corresponding portion of the fuel to flow through the heat exchanger bypass 216 of FIGS. 2A-3 (e.g., the ratio of the mass flow rate of fuel through the second heat exchanger to the mass flow rate of fuel flowing through the heat exchanger bypass 216, etc.).

In some examples, the bypass ratio determiner circuitry 504 can determine the bypass ratio for the second heat exchanger 214 based on the heat exchange rate of the first heat exchanger 212 determined during the execution of block 602, the mass flow rate of fuel through the second heat exchanger 214, the properties of the secondary heat source (e.g., the mass flow rate of the secondary heat source into the secondary heat source 218, the specific heat of the secondary heat source 218, the temperature of the secondary heat source 218, etc.), the temperature of the fuel entering the second heat exchanger 214, and the desired input condition of the fuel into the combustion section 224. For example, the bypass ratio of the second heat exchanger 214 can be determined such that the secondary heat source 218 heats the fuel to a target temperature and/or into a gaseous or supercritical state. That is, the bypass ratio determiner circuitry 504 can determine the bypass ratio of the second heat exchanger 214 such that the total amount of heat transferred into the fuel by the heat exchangers 212, 214 heats the fuel to a target temperature and/or into a desired state (e.g., gas, supercritical fluid, etc.). In some such examples, the bypass ratio determiner circuitry 504 can determine the bypass ratio on the liquid-vapor critical point of the fuel (e.g., the liquid-vapor critical point of hydrogen, the liquid-vapor critical point of methane, etc.) at the system pressure.

In other examples, the bypass ratio determiner circuitry 504 can determine a portion of the working fluid to flow through the second heat exchanger 408 and the corresponding portion of the fuel to flow through the heat exchanger bypass 409 (e.g., the ratio of the mass flow rate of working fluid through the second heat exchanger 408 to the mass flow rate of working flowing through the heat exchanger bypass 409, etc.). In some examples, the bypass ratio determiner circuitry 504 can determine the bypass ratio such that the working fluid has a temperature that causes the fuel to assume a target temperature and/or condition when exiting the third heat exchanger 412. In some examples, the bypass ratio determiner circuitry 504 can determine the bypass ratio for the second heat exchanger 408 based on the heat exchange rate of the first heat exchanger 406 determined during the execution of block 602, the mass flow rate of working fluid through the second heat exchanger 408, the specific heat of the working fluid, the properties of the secondary heat source (e.g., the mass flow rate of the secondary heat source into the secondary heat source 218, the specific heat of the secondary heat source 218, the temperature of the secondary heat source 218, etc.), the temperature of the working fluid entering the second heat exchanger 408, the properties of third heat exchanger 412 (e.g., the properties of the fuel entering the third heat exchanger 412, the geometry of the third heat exchanger 412, etc.) and the desired input condition of the fuel into the combustion section 224.

At block 606, the valve interface circuitry 506 actuates a value associated with the second heat exchanger 214 or 408 based on the determined bypass ratio. For example, the valve interface circuitry 506 can actuate the heat exchanger bypass valve 217 of FIGS. 2A-3 such that the flow rate of fuel through the second heat exchanger 214 and the heat exchanger bypass 216 is in accordance with the determined bypass ratio. In some examples, the valve interface circuitry 506 can actuate the bypass valve 410 of FIG. 4 such that the flow rate of working fluid through the second heat exchanger 408 and the heat exchanger bypass 409 is in accordance with the determined bypass ratio. At block 608, the valve interface circuitry 506 determines if the monitoring of the fuel distribution system is to continue. For example, the valve interface circuitry 506 can determine to continue monitoring a fuel distribution system (e.g., the first fuel distribution system 200, the second fuel distribution system 240, the third fuel distribution system 300, and/or the fourth fuel distribution system 400, etc.) based on the operation of such fuel distribution system (e.g., continue monitoring if the fuel distribution system is still operating, etc.). Additionally or alternatively, the valve interface circuitry 506 can determine whether to continue monitoring or cease monitoring based on a user input from an operator of the fuel distribution system and/or aircraft 100. If the valve interface circuitry 506 determines monitoring of the fuel distribution system is to continue, the operations 600 return to block 602. If the valve interface circuitry 506 determines to not continue monitoring the fuel distribution system (e.g., to cease monitoring the fuel distribution system, etc.), the operations 600 end.

Figure 7:
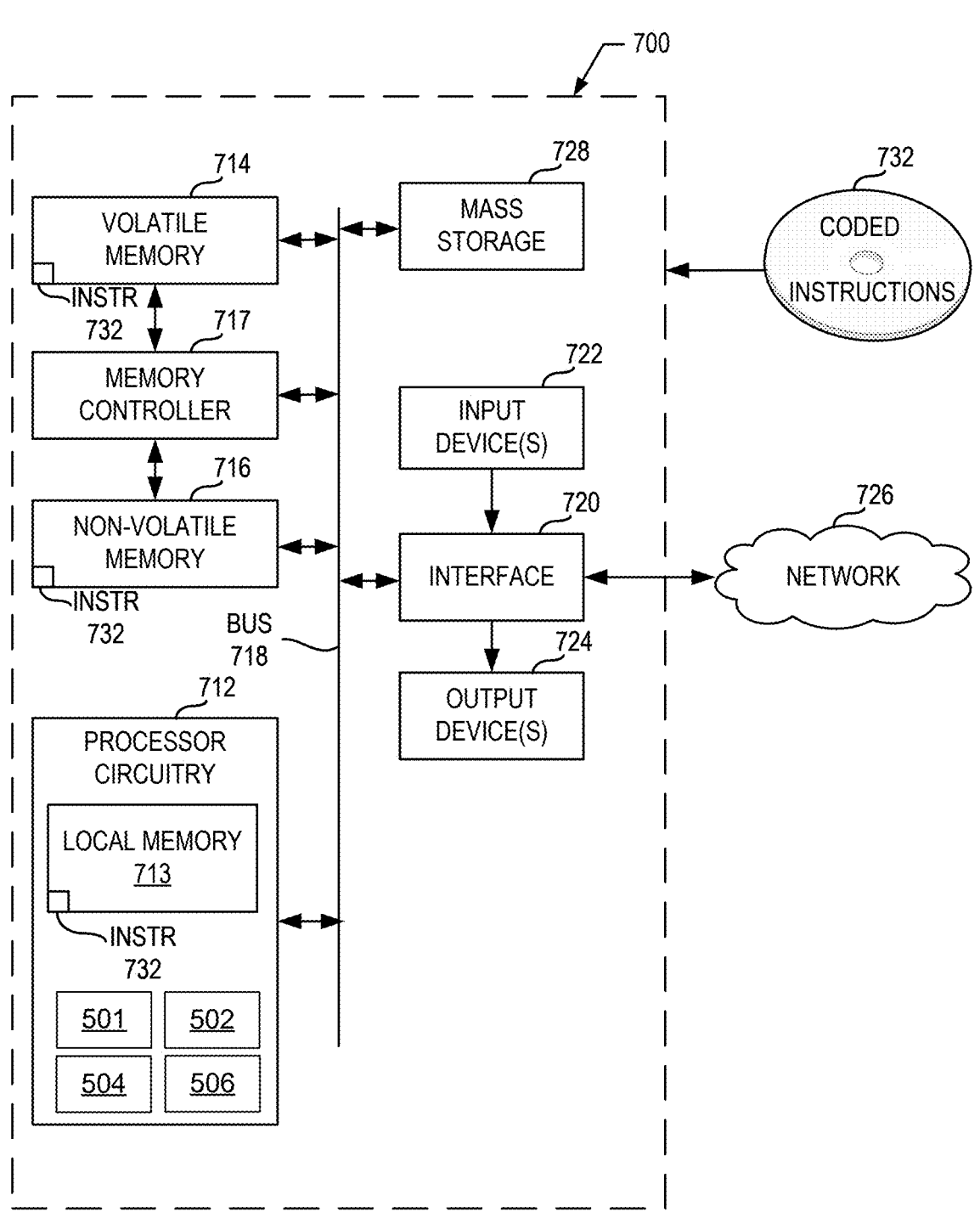
FIG. 7 is a block diagram of an example processing platform including programmable circuitry structured to execute, instantiate, and/or perform the example machine readable instructions and/or perform the example operations of FIG. 6 to implement the fuel distribution controller circuitry of FIG. 6.

FIG. 7 is a block diagram of an example programmable circuitry platform 700 structured to execute and/or instantiate the example machine-readable instructions and/or the example operations of FIG. 6 to implement the fuel distribution controller circuitry of FIG. 5. The programmable circuitry platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a headset (e.g., an augmented reality (AR) headset, a virtual reality (VR) headset, etc.) or other wearable device, or any other type of computing and/or electronic device.

The programmable circuitry platform 700 of the illustrated example includes programmable circuitry 712. The programmable circuitry 712 of the illustrated example is hardware. For example, the programmable circuitry 712 can be implemented by one or more integrated circuits, logic circuits, FPGAs, microprocessors, CPUs, GPUs, DSPs, and/or microcontrollers from any desired family or manufacturer. The programmable circuitry 712 may be implemented by one or more semiconductor based (e.g., silicon based) devices. In this example, the programmable circuitry 712 implements the sensor interface circuitry 501, the heat exchange rate determiner circuitry 502, the bypass ratio determiner circuitry 504, and the valve interface circuitry 506.

The programmable circuitry 712 of the illustrated example includes a local memory 713 (e.g., a cache, registers, etc.). The programmable circuitry 712 of the illustrated example is in communication with main memory 714, 716, which includes a volatile memory 714 and a non-volatile memory 716, by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717. In some examples, the memory controller 717 may be implemented by one or more integrated circuits, logic circuits, microcontrollers from any desired family or manufacturer, or any other type of circuitry to manage the flow of data going to and from the main memory 714, 716.

The programmable circuitry platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 722 are connected to the interface circuitry 720. The input device(s) 722 permit(s) a user (e.g., a human user, a machine user, etc.) to enter data and/or commands into the programmable circuitry 712. The input device(s) 722 can be implemented by, for example, an audio sensor, a microphone, a camera (still or video), a keyboard, a button, a mouse, a touchscreen, a trackpad, a trackball, an isopoint device, and/or a voice recognition system.

One or more output devices 724 are also connected to the interface circuitry 720 of the illustrated example. The output device(s) 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 700 of the illustrated example also includes one or more mass storage discs or devices 728 to store firmware, software, and/or data. Examples of such mass storage discs or devices 728 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 732, which may be implemented by the machine readable instructions of FIG. 6, may be stored in the mass storage device 728, in the volatile memory 714, in the non-volatile memory 716, and/or on at least one non-transitory computer readable storage medium such as a CD or DVD which may be removable.

Cryogenic fuel systems including heat exchangers and related methods are disclosed herein. Example cryogenic fuel systems disclosed herein include heat exchangers that exchange heat between hydraulic fluid and cryogenic fuel used to fuel aircraft. Examples disclosed herein mitigate (e.g., reduce, eliminate, etc.) the need for radiators and/or other dedicated heat exchangers to cool the hydraulic fluid of the aircraft and/or gas turbine engine. Examples disclosed herein enable the reduction of size of heat exchangers between the cryogenic fuel and a secondary heat source, which reduces the weight of the aircraft.

Further aspects are provided by the subject matter of the following clauses:

An aircraft comprising a cryogenic fuel system including a cryogenic fuel, a hydraulic system including a hydraulic fluid, a gas turbine engine fluidly coupled to the cryogenic fuel system, and a heat exchanger fluidly coupled to the cryogenic fuel system, the heat exchanger to exchange heat between the cryogenic fuel and at least one of (1) the hydraulic fluid or (2) a working fluid thermally coupled to the hydraulic system.

The aircraft of any preceding clause, further including an aero-surface and wherein the hydraulic system controls a position of the aero-surface.

The aircraft of any preceding clause, wherein the gas turbine engine includes a control valve, and wherein the hydraulic system controls a position of the control valve.

The aircraft of any preceding clause, wherein the heat exchanger is a first heat exchanger and further including a second heat exchanger to transfer heat between the cryogenic fuel and a secondary heat source.

The aircraft of any preceding clause, wherein the first heat exchanger is upstream of the second heat exchanger.

The aircraft of any preceding clause, wherein the heat exchanger is a first heat exchanger and further including a thermal management system including a thermal transport bus including a working fluid, a pump to pump the working fluid, a second heat exchanger fluidly coupled to a secondary heat source, and a third heat exchanger fluidly coupled to the first heat exchanger, the second heat exchanger and the pump.

The aircraft of any preceding clause, wherein the cryogenic fuel is liquid hydrogen.

An apparatus comprising a cryogenic fuel tank including a fuel, a hydraulic system including a hydraulic fluid, a combustor fluidly coupled to the cryogenic fuel tank, and a heat exchanger disposed between the combustor and the cryogenic fuel tank, the heat exchanger to increase a temperature of the hydraulic fluid.

The apparatus of any preceding clause, wherein the heat exchanger is configured to change a phase of the fuel from a liquid to a supercritical fluid.

The apparatus of any preceding clause, wherein the hydraulic system is a component of a control system of an aircraft.

The apparatus of any preceding clause, wherein the hydraulic system is a component of a control system of a gas turbine engine including the combustor.

The apparatus of any preceding clause, wherein the heat exchanger is a first heat exchanger and further including a second heat exchanger to transfer heat between the fuel and a secondary heat source.

The apparatus of any preceding clause, wherein the first heat exchanger is downstream of the second heat exchanger.

The apparatus of any preceding clause, wherein the heat exchanger is a first heat exchanger and further including a thermal transport bus including a working fluid, a second heat exchanger to transfer heat between the working fluid and a secondary heat source, and a third heat exchanger to exchange heat between the working fluid and the hydraulic fluid, the first heat exchanger to exchange heat between the working fluid and the fuel.

The apparatus of any preceding clause, wherein the heat exchanger is a first heat exchanger, the hydraulic system is a first hydraulic system, the hydraulic fluid is first hydraulic fluid, and further including a second hydraulic system including second hydraulic fluid, and a second heat exchanger to transfer heat between the fuel and the second hydraulic fluid.

The apparatus of any preceding clause, wherein the fuel is cryogenic methane.

A non-transitory computer readable medium including instructions that when executed cause a processor to determine a rate of heat transfer between a hydraulic fluid and a cryogenic fuel in a first heat exchanger, determine a bypass ratio based on the rate of heat transfer, and actuate a valve associated with a second heat exchanger based on the determined bypass ratio, a position of the valve to control a volume of the cryogenic fuel flowing into the second heat exchanger.

The non-transitory computer readable medium of any preceding clause, wherein the instructions when executed cause the processor to determine the rate of heat transfer based on at least one of a first specific heat of the hydraulic fluid, a second specific heat of the cryogenic fuel, a first flow rate of the hydraulic fluid, a second flow rate of the cryogenic fuel, and a temperature difference between cryogenic fuel and the hydraulic fluid.

The non-transitory computer readable medium of any preceding clause, wherein the instructions when executed cause the processor to determine the rate of heat transfer based on a flight phase of an aircraft including the first heat exchanger.

The non-transitory computer readable medium of any preceding clause, wherein the instructions when executed cause the processor to determine the bypass ratio based on a liquid-vapor critical point of the cryogenic fuel.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An aircraft comprising:

a cryogenic fuel system including a cryogenic fuel;

a first hydraulic system including a first hydraulic fluid;

a second hydraulic system including a second hydraulic fluid;

a gas turbine engine fluidly coupled to the cryogenic fuel system;

a first heat exchanger fluidly coupled to the cryogenic fuel system, the first heat exchanger configured to exchange heat between the cryogenic fuel and the first hydraulic fluid;

a second heat exchanger fluidly coupled to the cryogenic fuel system, the second heat exchanger configured to exchange heat between the cryogenic fuel and the second hydraulic fluid;

a third heat exchanger fluidly coupled to the cryogenic fuel system, the third heat exchanger disposed between the second heat exchanger and the gas turbine engine, the third heat exchanger configured to exchange heat from a secondary heat source to the cryogenic fuel;

a bypass valve in parallel with the third heat exchanger; and fuel distribution management circuitry to:

determine a bypass ratio for the third heat exchanger based on a heat exchange rate of the first heat exchanger; and adjust a position of the bypass valve based on the bypass ratio.

2. The aircraft of claim 1, further including an aero-surface and wherein the first hydraulic system controls a position of the aero-surface.

3. The aircraft of claim 1, wherein the gas turbine engine includes a control valve, and wherein the second hydraulic system controls a position of the control valve.

4. The aircraft of claim 1, wherein the first heat exchanger is upstream of the third heat exchanger.

5. The aircraft of claim 1, wherein the cryogenic fuel is liquid hydrogen.

6. An apparatus comprising:

a cryogenic fuel tank including a fuel;

a first hydraulic system including a first hydraulic fluid;

a second hydraulic system including a second hydraulic fluid;

a combustor fluidly coupled to the cryogenic fuel tank; and a first heat exchanger disposed between the combustor and the cryogenic fuel tank to receive the fuel from the cryogenic fuel tank, the first heat exchanger configured to decrease a temperature of the first hydraulic fluid;

a second heat exchanger disposed between the combustor and the cryogenic fuel tank to receive the fuel from the first heat exchanger, the second heat exchanger configured to decrease a temperature of the second hydraulic fluid;

a third heat exchanger disposed between the combustor and the cryogenic fuel tank, the third heat exchanger configured to exchange heat between the fuel and a secondary heat source;

a bypass valve in parallel with the third heat exchanger; and fuel distribution management circuitry to:

determine a bypass ratio for the third heat exchanger based on a heat exchange rate of the first heat exchanger; and adjust a position of the bypass valve based on the bypass ratio.

7. The apparatus of claim 6, wherein the third heat exchanger is configured to change a phase of the fuel from liquid to supercritical.

8. The apparatus of claim 6, wherein the first hydraulic system is a component of a control system of an aircraft.

9. The apparatus of claim 6, wherein the second hydraulic system is a component of a control system of a gas turbine engine including the combustor.

10. The apparatus of claim 6, wherein the fuel is cryogenic methane.

* * * * *